United States Patent
Cross et al.

(10) Patent No.: US 9,296,109 B2
(45) Date of Patent: *Mar. 29, 2016

(54) MOBILE ROBOT FOR TELECOMMUNICATION

(71) Applicant: iRobot Corporation, Bedford, MA (US)

(72) Inventors: Matthew Cross, Mason, NH (US); Tony L. Campbell, Pepperell, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,842

(22) Filed: Oct. 13, 2014

(65) Prior Publication Data

US 2015/0094854 A1    Apr. 2, 2015

Related U.S. Application Data

(63) Continuation of application No. 14/041,325, filed on Sep. 30, 2013, now Pat. No. 8,892,260, which is a continuation of application No. 13/562,315, filed on Jul. 31, 2012, now Pat. No. 8,577,501, which is a (Continued)

(51) Int. Cl.
*G06F 19/00* (2011.01)
*B25J 11/00* (2006.01)
(Continued)

(52) U.S. Cl.
CPC ............ *B25J 11/0005* (2013.01); *H04L 67/10* (2013.01); *H04N 7/15* (2013.01); *H04N 21/4788* (2013.01);
(Continued)

(58) Field of Classification Search
CPC ..... B25J 11/0005; H04N 21/478; H04N 7/15; Y10S 901/01; G05D 1/0022
USPC ......... 700/245, 247, 248, 251, 257, 258, 259, 700/260, 261, 262, 264; 318/567, 568.1, 318/568.11, 568.12, 568.13, 568.16, 318/568.21, 568.25; 600/117, 118, 258, 600/300, 407, 426, 429, 595; 901/1, 2, 17, 901/27, 47; 606/1, 102, 130, 139; 348/14.01, 14.02, 14.08, 14.05; 382/103, 153; 701/23, 28; 434/262; 180/168; 455/456.3; 342/357.31; 340/870.07

See application file for complete search history.

(56) References Cited

U.S. PATENT DOCUMENTS

| 4,413,693 A | 11/1983 | Derby |
| 4,638,445 A | 1/1987 | Mattaboni |

(Continued)

FOREIGN PATENT DOCUMENTS

| CA | 2289697 A1 | 11/1998 |
| CN | 101866396 | 10/2010 |

(Continued)

OTHER PUBLICATIONS

Rodoplu et al., Empirical Modeling and Estimation of End-to-End VoIP Delay over Mobile Multi-hop Wireless Networks, 2010, IEEE, p. 1-6.*

(Continued)

*Primary Examiner* — McDieunel Marc
(74) *Attorney, Agent, or Firm* — Honigman Miller Schwartz and Cohn LLP

(57) ABSTRACT

A system including a mobile telepresence robot, a to telepresence computing device in wireless communication with the robot, and a host computing device in wireless communication with the robot and the telepresence computing device. The host computing device relays User Datagram Protocol traffic between the robot and the telepresence computing device through a firewall.

19 Claims, 26 Drawing Sheets

Related U.S. Application Data continuation of application No. 11/862,197, filed on Sep. 27, 2007, now Pat. No. 8,265,793.

(60) Provisional application No. 60/974,404, filed on Sep. 21, 2007, provisional application No. 60/895,740, filed on Mar. 20, 2007.

(51) Int. Cl.
    *H04N 7/15*     (2006.01)
    *H04N 21/4788*     (2011.01)
    *H04L 29/08*     (2006.01)
    *H04W 4/00*     (2009.01)

(52) U.S. Cl.
CPC ............. *H04W 4/005* (2013.01); *Y10S 901/01* (2013.01); *Y10S 901/02* (2013.01); *Y10S 901/17* (2013.01); *Y10S 901/27* (2013.01); *Y10S 901/47* (2013.01)

(56) References Cited

U.S. PATENT DOCUMENTS

| | | | |
|---|---|---|---|
| 4,669,168 | A | 6/1987 | Tamura et al. |
| 4,697,472 | A | 10/1987 | Hiyane |
| 4,709,265 | A | 11/1987 | Silverman et al. |
| 4,751,658 | A | 6/1988 | Kadonoff et al. |
| 4,777,416 | A | 10/1988 | George, II et al. |
| 4,797,557 | A | 1/1989 | Ohman |
| 4,803,625 | A | 2/1989 | Fu et al. |
| 4,847,764 | A | 7/1989 | Halvorson |
| 4,875,172 | A | 10/1989 | Kanayama |
| 4,942,538 | A | 7/1990 | Yuan et al. |
| 4,953,159 | A | 8/1990 | Hayden et al. |
| 4,974,607 | A | 12/1990 | Miwa |
| 4,977,971 | A | 12/1990 | Crane, III et al. |
| 5,006,988 | A | 4/1991 | Borenstein et al. |
| 5,040,116 | A | 8/1991 | Evans, Jr. et al. |
| 5,051,906 | A | 9/1991 | Evans, Jr. et al. |
| 5,073,749 | A | 12/1991 | Kanayama |
| 5,084,828 | A | 1/1992 | Kaufman et al. |
| 5,130,794 | A | 7/1992 | Ritchey |
| 5,148,591 | A | 9/1992 | Pryor |
| 5,153,833 | A | 10/1992 | Gordon et al. |
| 5,155,684 | A | 10/1992 | Burke et al. |
| 5,157,491 | A | 10/1992 | Kassatly |
| 5,193,143 | A | 3/1993 | Kaemmerer et al. |
| 5,217,453 | A | 6/1993 | Wilk |
| 5,224,157 | A | 6/1993 | Yamada et al. |
| 5,231,693 | A | 7/1993 | Backes et al. |
| 5,236,432 | A | 8/1993 | Matsen, III et al. |
| 5,252,951 | A | 10/1993 | Tannenbaum et al. |
| 5,315,287 | A | 5/1994 | Sol |
| 5,319,611 | A | 6/1994 | Korba |
| 5,341,242 | A | 8/1994 | Gilboa et al. |
| 5,341,459 | A | 8/1994 | Backes |
| 5,350,033 | A | 9/1994 | Kraft |
| 5,366,896 | A | 11/1994 | Margrey et al. |
| 5,372,211 | A | 12/1994 | Wilcox et al. |
| 5,374,879 | A | 12/1994 | Pin et al. |
| 5,417,210 | A | 5/1995 | Funda et al. |
| 5,436,542 | A | 7/1995 | Petelin et al. |
| 5,441,047 | A | 8/1995 | David et al. |
| 5,442,728 | A | 8/1995 | Kaufman et al. |
| 5,462,051 | A | 10/1995 | Oka et al. |
| 5,539,741 | A | 7/1996 | Barraclough et al. |
| 5,544,649 | A | 8/1996 | David et al. |
| 5,553,609 | A | 9/1996 | Chen et al. |
| 5,572,229 | A | 11/1996 | Fisher |
| 5,572,999 | A | 11/1996 | Funda et al. |
| 5,594,859 | A | 1/1997 | Palmer et al. |
| 5,636,218 | A | 6/1997 | Ishikawa et al. |
| 5,652,849 | A | 7/1997 | Conway et al. |
| 5,682,199 | A | 10/1997 | Lankford |
| 5,684,695 | A | 11/1997 | Bauer |
| 5,701,904 | A | 12/1997 | Simmons et al. |
| 5,739,657 | A | 4/1998 | Takayama et al. |
| 5,749,058 | A | 5/1998 | Hashimoto |
| 5,749,362 | A | 5/1998 | Funda et al. |
| 5,762,458 | A | 6/1998 | Wang et al. |
| 5,767,897 | A | 6/1998 | Howell |
| 5,786,846 | A | 7/1998 | Hiroaki |
| 5,802,494 | A | 9/1998 | Kuno |
| 5,836,872 | A | 11/1998 | Kenet et al. |
| 5,867,653 | A | 2/1999 | Aras et al. |
| 5,876,325 | A | 3/1999 | Mizuno et al. |
| 5,911,036 | A | 6/1999 | Wright et al. |
| 5,917,958 | A | 6/1999 | Nunally et al. |
| 5,927,423 | A | 7/1999 | Wada et al. |
| 5,949,758 | A | 9/1999 | Kober |
| 5,954,692 | A | 9/1999 | Smith et al. |
| 5,959,423 | A | 9/1999 | Nakanishi et al. |
| 5,966,130 | A | 10/1999 | Benman, Jr. |
| 5,974,446 | A | 10/1999 | Sonnenreich et al. |
| 6,133,944 | A | 10/2000 | Braun et al. |
| 6,135,228 | A | 10/2000 | Asada et al. |
| 6,148,100 | A | 11/2000 | Anderson et al. |
| 6,170,929 | B1 | 1/2001 | Wilson et al. |
| 6,175,779 | B1 | 1/2001 | Barrett |
| 6,201,984 | B1 | 3/2001 | Funda et al. |
| 6,211,903 | B1 | 4/2001 | Bullister |
| 6,219,587 | B1 | 4/2001 | Ahlin et al. |
| 6,232,735 | B1 | 5/2001 | Baba et al. |
| 6,233,504 | B1 | 5/2001 | Das et al. |
| 6,256,556 | B1 | 7/2001 | Zenke |
| 6,259,806 | B1 | 7/2001 | Green |
| 6,259,956 | B1 | 7/2001 | Myers et al. |
| 6,266,162 | B1 | 7/2001 | Okamura et al. |
| 6,266,577 | B1 | 7/2001 | Popp et al. |
| 6,289,263 | B1 | 9/2001 | Mukherjee |
| 6,292,713 | B1 | 9/2001 | Jouppi et al. |
| 6,304,050 | B1 | 10/2001 | Skaar et al. |
| 6,321,137 | B1 | 11/2001 | De Smet |
| 6,323,942 | B1 | 11/2001 | Bamji |
| 6,325,756 | B1 | 12/2001 | Webb et al. |
| 6,327,516 | B1 | 12/2001 | Zenke |
| 6,330,486 | B1 | 12/2001 | Padula |
| 6,330,493 | B1 | 12/2001 | Takahashi et al. |
| 6,346,950 | B1 | 2/2002 | Jouppi |
| 6,346,962 | B1 | 2/2002 | Goodridge |
| 6,369,847 | B1 | 4/2002 | James et al. |
| 6,408,230 | B2 | 6/2002 | Wada |
| 6,430,471 | B1 | 8/2002 | Kintou et al. |
| 6,430,475 | B2 | 8/2002 | Okamoto et al. |
| 6,438,457 | B1 | 8/2002 | Yokoo et al. |
| 6,452,915 | B1 | 9/2002 | Jorgensen |
| 6,463,352 | B1 | 10/2002 | Tadokoro et al. |
| 6,463,361 | B1 | 10/2002 | Wang et al. |
| 6,466,844 | B1 | 10/2002 | Ikeda et al. |
| 6,468,265 | B1 | 10/2002 | Evans et al. |
| 6,491,701 | B2 | 12/2002 | Tierney et al. |
| 6,496,099 | B2 | 12/2002 | Wang et al. |
| 6,496,755 | B2 | 12/2002 | Wallach et al. |
| 6,501,740 | B1 | 12/2002 | Sun et al. |
| 6,507,773 | B2 | 1/2003 | Parker et al. |
| 6,515,740 | B2 | 2/2003 | Bamji et al. |
| 6,522,906 | B1 | 2/2003 | Salisbury, Jr. et al. |
| 6,523,629 | B1 | 2/2003 | Buttz et al. |
| 6,526,332 | B2 | 2/2003 | Sakamoto et al. |
| 6,529,765 | B1 | 3/2003 | Franck et al. |
| 6,529,802 | B1 | 3/2003 | Kawakita et al. |
| 6,532,404 | B2 | 3/2003 | Colens |
| 6,535,182 | B2 | 3/2003 | Stanton |
| 6,535,793 | B2 | 3/2003 | Allard |
| 6,540,039 | B1 | 4/2003 | Yu et al. |
| 6,543,899 | B2 | 4/2003 | Covannon et al. |
| 6,549,215 | B2 | 4/2003 | Jouppi |
| 6,563,533 | B1 | 5/2003 | Colby |
| 6,580,246 | B2 | 6/2003 | Jacobs |
| 6,584,376 | B1 | 6/2003 | Van Kommer |
| 6,604,019 | B2 | 8/2003 | Ahlin et al. |
| 6,604,021 | B2 | 8/2003 | Imai et al. |
| 6,611,120 | B2 | 8/2003 | Song et al. |
| 6,646,677 | B2 | 11/2003 | Noro et al. |

(56) References Cited

U.S. PATENT DOCUMENTS

| | | |
|---|---|---|
| 6,650,748 B1 | 11/2003 | Edwards et al. |
| 6,659,215 B1 | 12/2003 | Lie |
| 6,684,129 B2 | 1/2004 | Salisbury, Jr. et al. |
| 6,691,000 B2 | 2/2004 | Nagai et al. |
| 6,710,797 B1 | 3/2004 | McNelley et al. |
| 6,728,599 B2 | 4/2004 | Wang et al. |
| 6,764,373 B1 | 7/2004 | Osawa et al. |
| 6,769,771 B2 | 8/2004 | Trumbull |
| 6,781,606 B2 | 8/2004 | Jouppi |
| 6,784,916 B2 | 8/2004 | Smith |
| 6,785,589 B2 | 8/2004 | Eggenberger et al. |
| 6,791,550 B2 | 9/2004 | Goldhor et al. |
| 6,799,065 B1 | 9/2004 | Niemeyer |
| 6,799,088 B2 | 9/2004 | Wang et al. |
| 6,804,580 B1 | 10/2004 | Stoddard et al. |
| 6,804,656 B1 | 10/2004 | Rosenfeld et al. |
| 6,810,411 B1 | 10/2004 | Coughlin et al. |
| 6,836,703 B2 | 12/2004 | Wang et al. |
| 6,839,612 B2 | 1/2005 | Sanchez et al. |
| 6,840,904 B2 | 1/2005 | Goldberg |
| 6,845,297 B2 | 1/2005 | Allard |
| 6,852,107 B2 | 2/2005 | Wang et al. |
| 6,853,878 B2 | 2/2005 | Hirayama et al. |
| 6,853,880 B2 | 2/2005 | Sakagami et al. |
| 6,871,117 B2 | 3/2005 | Wang et al. |
| 6,879,879 B2 | 4/2005 | Jouppi et al. |
| 6,892,112 B2 | 5/2005 | Wang et al. |
| 6,895,305 B2 | 5/2005 | Lathan et al. |
| 6,909,708 B1 | 6/2005 | Krishnaswamy et al. |
| 6,914,622 B1 | 7/2005 | Smith et al. |
| 6,925,357 B2 | 8/2005 | Wang et al. |
| 6,951,535 B2 | 10/2005 | Ghodoussi et al. |
| 6,958,706 B2 | 10/2005 | Chaco et al. |
| 6,965,394 B2 | 11/2005 | Gutta et al. |
| 6,985,480 B2 | 1/2006 | Brown |
| 6,995,664 B1 | 2/2006 | Darling |
| 7,030,757 B2 | 4/2006 | Matsuhira et al. |
| 7,092,001 B2 | 8/2006 | Schulz |
| 7,096,090 B1 | 8/2006 | Zweig |
| 7,115,102 B2 | 10/2006 | Abbruscato |
| 7,115,849 B2 | 10/2006 | Dowski, Jr. et al. |
| 7,117,067 B2 | 10/2006 | McLurkin et al. |
| 7,123,285 B2 | 10/2006 | Smith et al. |
| 7,123,974 B1 | 10/2006 | Hamilton |
| 7,123,991 B2 | 10/2006 | Graf et al. |
| 7,127,325 B2 | 10/2006 | Nagata et al. |
| 7,129,970 B2 | 10/2006 | James et al. |
| 7,133,062 B2 | 11/2006 | Castles et al. |
| 7,142,945 B2 | 11/2006 | Wang et al. |
| 7,142,947 B2 | 11/2006 | Wang et al. |
| 7,151,982 B2 | 12/2006 | Liff et al. |
| 7,154,526 B2 | 12/2006 | Foote et al. |
| 7,155,306 B2 | 12/2006 | Haitin et al. |
| 7,156,809 B2 | 1/2007 | Quy |
| 7,158,317 B2 | 1/2007 | Ben-Eliezer et al. |
| 7,158,859 B2 | 1/2007 | Wang et al. |
| 7,158,860 B2 | 1/2007 | Wang et al. |
| 7,161,322 B2 | 1/2007 | Wang et al. |
| 7,162,338 B2 | 1/2007 | Goncalves et al. |
| 7,164,969 B2 | 1/2007 | Wang et al. |
| 7,171,286 B2 | 1/2007 | Wang et al. |
| 7,174,238 B1 | 2/2007 | Zweig |
| 7,184,559 B2 | 2/2007 | Jouppi |
| 7,188,000 B2 | 3/2007 | Chiappetta et al. |
| 7,206,627 B2 | 4/2007 | Abovitz et al. |
| 7,215,786 B2 | 5/2007 | Nakadai et al. |
| 7,256,708 B2 | 8/2007 | Rosenfeld et al. |
| 7,262,573 B2 | 8/2007 | Wang et al. |
| 7,283,893 B2 | 10/2007 | Hara et al. |
| 7,289,883 B2 | 10/2007 | Wang et al. |
| 7,321,807 B2 | 1/2008 | Laski |
| 7,340,077 B2 | 3/2008 | Gokturk et al. |
| 7,346,429 B2 | 3/2008 | Goldenberg et al. |
| 7,382,399 B1 | 6/2008 | McCall et al. |
| 7,432,949 B2 | 10/2008 | Remy et al. |
| 7,433,024 B2 | 10/2008 | Garcia et al. |
| 7,441,953 B2 | 10/2008 | Banks |
| 7,624,166 B2 | 11/2009 | Foote et al. |
| 7,633,586 B2 | 12/2009 | Winlow et al. |
| 7,706,917 B1 | 4/2010 | Chiappetta et al. |
| 7,720,572 B2 * | 5/2010 | Ziegler et al. ............... 700/245 |
| 7,844,364 B2 | 11/2010 | McLurkin et al. |
| 7,924,323 B2 | 4/2011 | Walker et al. |
| 7,957,837 B2 * | 6/2011 | Ziegler et al. ............... 700/258 |
| 8,195,333 B2 * | 6/2012 | Ziegler et al. ............... 700/259 |
| 8,265,793 B2 * | 9/2012 | Cross et al. ............... 700/259 |
| 8,892,260 B2 * | 11/2014 | Cross et al. ............... 700/259 |
| 2001/0002448 A1 | 5/2001 | Wilson et al. |
| 2001/0010053 A1 | 7/2001 | Ben-Shachar et al. |
| 2001/0034475 A1 | 10/2001 | Flach et al. |
| 2001/0037163 A1 | 11/2001 | Allard |
| 2001/0051881 A1 | 12/2001 | Filler |
| 2001/0054071 A1 | 12/2001 | Loeb |
| 2002/0015296 A1 | 2/2002 | Howell et al. |
| 2002/0027597 A1 | 3/2002 | Sachau |
| 2002/0049517 A1 | 4/2002 | Ruffner |
| 2002/0055917 A1 | 5/2002 | Muraca |
| 2002/0057279 A1 | 5/2002 | Jouppi |
| 2002/0058929 A1 | 5/2002 | Green |
| 2002/0059587 A1 | 5/2002 | Cofano et al. |
| 2002/0063726 A1 | 5/2002 | Jouppi |
| 2002/0073429 A1 | 6/2002 | Beane et al. |
| 2002/0082498 A1 | 6/2002 | Wendt et al. |
| 2002/0095238 A1 | 7/2002 | Ahlin et al. |
| 2002/0098879 A1 | 7/2002 | Rheey |
| 2002/0104094 A1 | 8/2002 | Alexander et al. |
| 2002/0111988 A1 | 8/2002 | Sato |
| 2002/0120362 A1 | 8/2002 | Lathan et al. |
| 2002/0130950 A1 | 9/2002 | James et al. |
| 2002/0141595 A1 | 10/2002 | Jouppi |
| 2002/0143923 A1 | 10/2002 | Alexander |
| 2002/0177925 A1 | 11/2002 | Onishi et al. |
| 2002/0183894 A1 | 12/2002 | Wang et al. |
| 2002/0184674 A1 | 12/2002 | Xi et al. |
| 2002/0186243 A1 | 12/2002 | Ellis et al. |
| 2003/0003962 A1 | 1/2003 | Vooi-Kia et al. |
| 2003/0030397 A1 | 2/2003 | Simmons |
| 2003/0048481 A1 | 3/2003 | Kobayashi et al. |
| 2003/0050733 A1 | 3/2003 | Wang et al. |
| 2003/0060808 A1 | 3/2003 | Wilk |
| 2003/0069752 A1 | 4/2003 | LeDain et al. |
| 2003/0100892 A1 | 5/2003 | Morley et al. |
| 2003/0104806 A1 | 6/2003 | Ruef et al. |
| 2003/0114962 A1 | 6/2003 | Niemeyer |
| 2003/0135203 A1 | 7/2003 | Wang et al. |
| 2003/0144579 A1 | 7/2003 | Buss |
| 2003/0144649 A1 | 7/2003 | Ghodoussi et al. |
| 2003/0151658 A1 | 8/2003 | Smith |
| 2003/0171710 A1 | 9/2003 | Bassuk et al. |
| 2003/0174285 A1 | 9/2003 | Trumbull |
| 2003/0180697 A1 | 9/2003 | Kim et al. |
| 2003/0199000 A1 | 10/2003 | Valkirs et al. |
| 2003/0216834 A1 | 11/2003 | Allard |
| 2003/0220541 A1 | 11/2003 | Salisbury et al. |
| 2003/0231244 A1 | 12/2003 | Bonilla et al. |
| 2003/0232649 A1 | 12/2003 | Gizis et al. |
| 2004/0012362 A1 | 1/2004 | Tsurumi |
| 2004/0013295 A1 | 1/2004 | Sabe et al. |
| 2004/0019406 A1 | 1/2004 | Wang et al. |
| 2004/0024490 A1 | 2/2004 | McLurkin et al. |
| 2004/0027086 A1 | 2/2004 | Ogawa et al. |
| 2004/0041904 A1 | 3/2004 | Lapalme et al. |
| 2004/0065073 A1 | 4/2004 | Nash |
| 2004/0068657 A1 | 4/2004 | Alexander et al. |
| 2004/0078219 A1 | 4/2004 | Kaylor et al. |
| 2004/0080610 A1 | 4/2004 | James et al. |
| 2004/0088077 A1 | 5/2004 | Jouppi et al. |
| 2004/0093409 A1 | 5/2004 | Thompson et al. |
| 2004/0098167 A1 | 5/2004 | Yi et al. |
| 2004/0102167 A1 | 5/2004 | Shim et al. |
| 2004/0117065 A1 | 6/2004 | Wang et al. |
| 2004/0138547 A1 | 7/2004 | Wang et al. |
| 2004/0143421 A1 | 7/2004 | Wang et al. |
| 2004/0148638 A1 | 7/2004 | Weisman et al. |

(56) References Cited

U.S. PATENT DOCUMENTS

| | | |
|---|---|---|
| 2004/0153211 A1 | 8/2004 | Kamoto et al. |
| 2004/0157612 A1 | 8/2004 | Kim |
| 2004/0162637 A1 | 8/2004 | Wang et al. |
| 2004/0167666 A1 | 8/2004 | Wang et al. |
| 2004/0167668 A1 | 8/2004 | Wang et al. |
| 2004/0172301 A1 | 9/2004 | Mihai et al. |
| 2004/0174129 A1 | 9/2004 | Wang et al. |
| 2004/0175684 A1 | 9/2004 | Kaasa et al. |
| 2004/0179714 A1 | 9/2004 | Jouppi |
| 2004/0201602 A1 | 10/2004 | Mody et al. |
| 2004/0204074 A1* | 10/2004 | Desai .................... 455/557 |
| 2004/0215490 A1 | 10/2004 | Duchon et al. |
| 2004/0230340 A1 | 11/2004 | Fukuchi et al. |
| 2005/0003330 A1 | 1/2005 | Asgarinejad et al. |
| 2005/0021182 A1 | 1/2005 | Wang et al. |
| 2005/0021183 A1 | 1/2005 | Wang et al. |
| 2005/0021187 A1 | 1/2005 | Wang et al. |
| 2005/0021309 A1 | 1/2005 | Alexander et al. |
| 2005/0024485 A1 | 2/2005 | Castles et al. |
| 2005/0027567 A1 | 2/2005 | Taha |
| 2005/0027794 A1 | 2/2005 | Decker |
| 2005/0028221 A1 | 2/2005 | Liu et al. |
| 2005/0035862 A1 | 2/2005 | Wildman et al. |
| 2005/0038416 A1 | 2/2005 | Wang et al. |
| 2005/0038564 A1 | 2/2005 | Burick |
| 2005/0052527 A1 | 3/2005 | Remy et al. |
| 2005/0057699 A1 | 3/2005 | Bowser |
| 2005/0065435 A1 | 3/2005 | Rauch et al. |
| 2005/0065659 A1 | 3/2005 | Tanaka et al. |
| 2005/0065813 A1 | 3/2005 | Mishelevich et al. |
| 2005/0071046 A1 | 3/2005 | Miyazaki et al. |
| 2005/0099493 A1 | 5/2005 | Chew |
| 2005/0110867 A1 | 5/2005 | Schulz |
| 2005/0151496 A1 | 7/2005 | Furuta et al. |
| 2005/0154265 A1 | 7/2005 | Miro et al. |
| 2005/0182322 A1 | 8/2005 | Grispo |
| 2005/0192721 A1 | 9/2005 | Jouppi |
| 2005/0204438 A1 | 9/2005 | Wang et al. |
| 2005/0216126 A1 | 9/2005 | Koselka et al. |
| 2005/0219356 A1 | 10/2005 | Smith et al. |
| 2005/0267826 A1 | 12/2005 | Levy et al. |
| 2005/0283414 A1 | 12/2005 | Fernandes et al. |
| 2005/0286494 A1 | 12/2005 | Hollatz et al. |
| 2006/0007943 A1 | 1/2006 | Fellman |
| 2006/0013263 A1 | 1/2006 | Fellman |
| 2006/0013469 A1 | 1/2006 | Wang et al. |
| 2006/0013488 A1 | 1/2006 | Inoue |
| 2006/0029065 A1 | 2/2006 | Fellman |
| 2006/0047365 A1 | 3/2006 | Ghodoussi et al. |
| 2006/0052676 A1 | 3/2006 | Wang et al. |
| 2006/0052684 A1 | 3/2006 | Takahashi et al. |
| 2006/0064212 A1 | 3/2006 | Thorne |
| 2006/0082642 A1 | 4/2006 | Wang et al. |
| 2006/0087746 A1 | 4/2006 | Lipow |
| 2006/0095170 A1 | 5/2006 | Yang et al. |
| 2006/0098573 A1 | 5/2006 | Beer et al. |
| 2006/0103659 A1 | 5/2006 | Karandikar et al. |
| 2006/0104279 A1 | 5/2006 | Fellman et al. |
| 2006/0106493 A1 | 5/2006 | Niemeyer et al. |
| 2006/0122482 A1 | 6/2006 | Mariotti et al. |
| 2006/0142983 A1 | 6/2006 | Sorensen et al. |
| 2006/0161303 A1 | 7/2006 | Wang et al. |
| 2006/0173712 A1 | 8/2006 | Joubert |
| 2006/0178776 A1 | 8/2006 | Feingold et al. |
| 2006/0189393 A1 | 8/2006 | Edery |
| 2006/0195569 A1 | 8/2006 | Barker |
| 2006/0209794 A1 | 9/2006 | Bae et al. |
| 2006/0249314 A1 | 11/2006 | Takenaka et al. |
| 2006/0259193 A1 | 11/2006 | Wang et al. |
| 2006/0293788 A1 | 12/2006 | Pogodin |
| 2007/0021871 A1 | 1/2007 | Wang et al. |
| 2007/0046237 A1 | 3/2007 | Lakshmanan et al. |
| 2007/0064092 A1 | 3/2007 | Sandbeg et al. |
| 2007/0076729 A1 | 4/2007 | Takeda |
| 2007/0078566 A1 | 4/2007 | Wang et al. |
| 2007/0100498 A1 | 5/2007 | Matsumoto et al. |
| 2007/0114075 A1 | 5/2007 | Buehler et al. |
| 2007/0117516 A1 | 5/2007 | Saidi et al. |
| 2007/0120965 A1 | 5/2007 | Sandberg et al. |
| 2007/0135967 A1 | 6/2007 | Jung et al. |
| 2007/0136405 A1 | 6/2007 | Weinstein et al. |
| 2007/0142964 A1 | 6/2007 | Abramson |
| 2007/0152427 A1 | 7/2007 | Olsen |
| 2007/0153801 A1 | 7/2007 | Sung et al. |
| 2007/0159979 A1 | 7/2007 | Butler et al. |
| 2007/0189311 A1 | 8/2007 | Kim et al. |
| 2007/0192910 A1 | 8/2007 | Vu et al. |
| 2007/0197896 A1 | 8/2007 | Moll et al. |
| 2007/0198128 A1 | 8/2007 | Ziegler et al. |
| 2007/0199108 A1 | 8/2007 | Angle et al. |
| 2007/0250212 A1 | 10/2007 | Halloran et al. |
| 2007/0262884 A1 | 11/2007 | Goncalves et al. |
| 2007/0273751 A1 | 11/2007 | Sachau |
| 2007/0291109 A1 | 12/2007 | Wang et al. |
| 2007/0291128 A1 | 12/2007 | Wang et al. |
| 2007/0293985 A1 | 12/2007 | Myeong et al. |
| 2008/0011904 A1 | 1/2008 | Cepollina et al. |
| 2008/0065268 A1 | 3/2008 | Wang et al. |
| 2008/0082211 A1 | 4/2008 | Wang et al. |
| 2008/0105481 A1 | 5/2008 | Hutcheson et al. |
| 2008/0106746 A1 | 5/2008 | Shpunt et al. |
| 2008/0201014 A1 | 8/2008 | Sonoura |
| 2008/0201017 A1 | 8/2008 | Wang et al. |
| 2008/0215987 A1 | 9/2008 | Alexander et al. |
| 2008/0229531 A1 | 9/2008 | Takida |
| 2008/0240502 A1 | 10/2008 | Freedman et al. |
| 2008/0255703 A1 | 10/2008 | Wang et al. |
| 2008/0281467 A1 | 11/2008 | Pinter |
| 2009/0055023 A1 | 2/2009 | Walters et al. |
| 2009/0096783 A1 | 4/2009 | Shpunt et al. |
| 2009/0105882 A1 | 4/2009 | Wang et al. |
| 2009/0125147 A1 | 5/2009 | Wang et al. |
| 2009/0164045 A1 | 6/2009 | Deguire et al. |
| 2009/0177323 A1 | 7/2009 | Ziegler et al. |
| 2009/0185274 A1 | 7/2009 | Shpunt |
| 2009/0226113 A1 | 9/2009 | Matsumoto et al. |
| 2009/0240371 A1 | 9/2009 | Wang et al. |
| 2009/0259339 A1 | 10/2009 | Wright et al. |
| 2010/0010672 A1 | 1/2010 | Wang et al. |
| 2010/0010673 A1 | 1/2010 | Wang et al. |
| 2010/0019715 A1 | 1/2010 | Roe et al. |
| 2010/0020078 A1 | 1/2010 | Shpunt |
| 2010/0034457 A1 | 2/2010 | Berliner et al. |
| 2010/0066587 A1 | 3/2010 | Yamauchi et al. |
| 2010/0070079 A1 | 3/2010 | Mangaser et al. |
| 2010/0073490 A1 | 3/2010 | Wang et al. |
| 2010/0115418 A1 | 5/2010 | Wang et al. |
| 2010/0118123 A1 | 5/2010 | Freedman et al. |
| 2010/0131103 A1 | 5/2010 | Herzog et al. |
| 2010/0191375 A1 | 7/2010 | Wright et al. |
| 2010/0268383 A1 | 10/2010 | Wang et al. |
| 2011/0050841 A1 | 3/2011 | Wang et al. |
| 2011/0071702 A1 | 3/2011 | Wang et al. |
| 2011/0187875 A1 | 8/2011 | Sanchez et al. |
| 2011/0190930 A1 | 8/2011 | Hanrahan et al. |
| 2011/0218674 A1 | 9/2011 | Stuart et al. |
| 2011/0288684 A1 | 11/2011 | Farlow et al. |
| 2011/0292193 A1 | 12/2011 | Wang et al. |
| 2011/0301759 A1 | 12/2011 | Wang et al. |
| 2013/0139193 A1* | 5/2013 | Fan et al. .................... 725/14 |

FOREIGN PATENT DOCUMENTS

| | | |
|---|---|---|
| CN | 101978365 | 2/2011 |
| CN | 101106939 | 11/2011 |
| EP | 0981905 B1 | 1/2002 |
| EP | 1262142 A2 | 12/2002 |
| EP | 1536660 A2 | 6/2005 |
| EP | 1536660 A3 | 4/2008 |
| EP | 2263158 A2 | 12/2010 |
| EP | 2300930 A1 | 3/2011 |
| GB | 2431261 A | 4/2007 |
| JP | 07213753 | 8/1995 |
| JP | 07248823 | 9/1995 |

(56) References Cited

FOREIGN PATENT DOCUMENTS

| JP | 08084328 | 3/1996 |
|---|---|---|
| JP | 07257422 | 12/1996 |
| JP | 08320727 | 12/1996 |
| JP | 09267276 | 10/1997 |
| JP | 10079097 | 3/1998 |
| JP | 10288689 | 10/1998 |
| JP | 00032319 | 1/2000 |
| JP | 00049800 | 2/2000 |
| JP | 00079587 | 3/2000 |
| JP | 00196876 | 7/2000 |
| JP | 00188124 | 4/2001 |
| JP | 01125641 | 5/2001 |
| JP | 01147718 | 5/2001 |
| JP | 01179663 | 7/2001 |
| JP | 01198865 | 7/2001 |
| JP | 01198868 | 7/2001 |
| JP | 01199356 | 7/2001 |
| JP | 02000574 | 1/2002 |
| JP | 02035423 | 2/2002 |
| JP | 02046088 | 2/2002 |
| JP | 02305743 | 10/2002 |
| JP | 02355779 | 12/2002 |
| JP | 04261941 | 9/2004 |
| JP | 04524824 | 9/2004 |
| JP | 05028066 | 2/2005 |
| JP | 10064154 | 3/2010 |
| JP | 10532109 | 9/2010 |
| JP | 10246954 | 11/2010 |
| KR | 060037979 | 5/2006 |
| KR | 100019479 | 2/2010 |
| KR | 100139037 | 12/2010 |
| WO | WO-9306690 A1 | 4/1993 |
| WO | WO-9851078 A1 | 11/1998 |
| WO | WO-9967067 A1 | 12/1999 |
| WO | WO-0033726 A1 | 6/2000 |
| WO | WO-03077745 A1 | 9/2003 |
| WO | WO-2004075456 A2 | 9/2004 |
| WO | WO-2006012797 A1 | 2/2006 |
| WO | WO-2006078611 A2 | 7/2006 |
| WO | WO-2007041038 A2 | 4/2007 |
| WO | WO-2007041295 A2 | 4/2007 |
| WO | WO-2008100272 A2 | 8/2008 |
| WO | WO-2008100272 A3 | 10/2008 |
| WO | WO-2009117274 A2 | 9/2009 |
| WO | WO-2009128997 A1 | 10/2009 |
| WO | WO-2009145958 A2 | 12/2009 |
| WO | WO-2010006205 A1 | 1/2010 |
| WO | WO-2010006211 A1 | 1/2010 |
| WO | WO-2010033666 A1 | 3/2010 |
| WO | WO-2010047881 A1 | 4/2010 |
| WO | WO-2010062798 A1 | 6/2010 |
| WO | WO-2010065257 A1 | 6/2010 |
| WO | WO-2010120407 A1 | 10/2010 |
| WO | WO-2011028589 A2 | 3/2011 |
| WO | WO-2011028589 A3 | 4/2011 |
| WO | WO-2011097130 A2 | 8/2011 |
| WO | WO-2011097132 A2 | 8/2011 |
| WO | WO-2011109336 A2 | 9/2011 |
| WO | WO-2011097132 A3 | 12/2011 |
| WO | WO-2011149902 A2 | 12/2011 |

OTHER PUBLICATIONS

Pleva et al., Speech and Mobile Technologies for Cognitive Communication and Information Systems, 2005, IEEE, p. 1-5.*
Ren et al., ASAP: an AS-Aware Peer-Relay Protocol for High Quality VoIP, 2006, IEEE, p. 1-10.*
Xiaohui et al., The design and Implementation of Real-Time Internet-Based Telerobotics, 2003, IEEE, p. 815-819.*
Office Action for U.S. Appl. No. 11/862,197, dated Nov. 1, 2010.
Office Action for U.S. Appl. No. 11/862,197, dated Mar. 28, 2011.
Office Action for U.S. Appl. No. 13/562,315 dated Jan. 4, 2013.
Australian examination report for related Application No. 2011256720 dated Mar. 27, 2014.
Adams, Chris, "Mobile Robotics Research Group", Mobile Robotics Research Group, Edinburgh University, http://www.dai.ed.ac.uk/groups/mrg/MRG.html, Internet, Edinburgh. Duplicate of 575084, 2000, pp. 1-2.
Ando, et al., "A Multimedia Self-service Terminal with Conferencing Functions", IEEE, Jul. 5-7, 1995, pp. 357-362.
Android Amusement Corp., "What Marketing Secret . . . Renting Robots from Android Amusement Corp!", (Advertisement), 1982.
Applebome, "Planning Domesticated Robots for Tomorrow's Household", New York Times, http://www.theoldrobots.com/images17/dc17.JPG, Mar. 4,1982, pp. 21, 23.
Baltus, et al., "Towards Personal Service Robots for the Elderly, Proceedings for the Elderly Workshop on Interactive Robots and Entertainment", Computer Science and Robotics, 2000.
Bar-Cohen, et al., "Virtual reality robotic telesurgery simulations using MEMICA haptic system", Internet, Mar. 5, 2001, pp. 1-7.
Bauer, Jeffrey C. et al., "Service Robots in Health Care: The Evolution of Mechanical Solutions to Human Resource Problems", Jun. 2003.
Bauer, John et al., "Remote telesurgical mentoring: feasibility and efficacy", IEEE, 2000, pp. 1-9.
Bischoff, "Design Concept and Realization of the Humanoid Service Robot HERMES", Field and Service Robotics, Springer, London, 1998, pp. 485-492.
Blackwell, Gerry, "Video: A Wireless LAN Killer App?", Internet, Apr. 16, 2002, pp. 1-3.
Breslow, Michael J. et al., "Effect of a multiple-site intensive care unit telemedicine program on clinical and economic outcome an alternative paradigm for intensivist staffing", Critical Care Med; vol. 32 No. 1, Jan. 2004, pp. 31-38.
Brooks, Rodney, "Remote Presence", Abstracts from Flesh & Machines, How Robots Will Change Us, Feb. 2002, pp. 131-147.
Candelas, Herias et al., "Flexible virtual and remote laboratory for teaching Robotics", FORMATEX 2006; Proc. Advance in Control Education Madrid, Spain, Jun. 2006, pp. 21-23.
Celi, et al., "The EICU: It's not just telemedicine", Critical Care Medicine vol. 29, No. 8 (Supplement), Aug. 2001.
Cheetham, Anastasia et al., "Interface Development for a Child's Video Conferencing Robot", 2000, pp. 1-4.
Cleary, et al., "State of the art in surgical robotics: Clinical applications and technology challenges", Internet, Feb. 24, 2002, pp. 1-26.
CNN, "Floating 'droids' to roam space corridors of the future", Internet, Jan. 12, 2000, pp. 1-4.
cnn.com/technology, "Paging R.Robot: Machine helps doctors with patients", Internet, Sep. 30, 2003, 1-3.
Crowley, Susan L., "Hello to Our Future", AARP Bulletin, http://www.cs.cmu.ed/-nursebot/web/press/aarp 99_14/millennium.html, Jan. 2000.
Dalton, "Techniques for Web Telerobotics", PhD Thesis, University of Western Australia, http://telerobot.mech.uwa.edu.au/information.html, http://catalogue.library.uwa.edu.au/search, 2001, 27-62 pp. 149-191.
Davies, "Robotics in Minimally Invasive Surgery", Internet, 1995, pp. 5/1-5/2.
DiGiorgio, James, "Is Your Emergency Department of the Leading Edge?", Internet, 2005, pp. 1-4.
Discovery Channel Canada, "Inventing the Future: 2000 Years of Discovery", (Video Transcript), Jan. 2, 2000.
Elhajj, et al., "Supermedia in Internet-based telerobotic operations", Internet, 2001, pp. 1-14.
Elhajj, et al., "Synchronization and Control of Supermedia Transmission Via the Internet", Proceedings of 2001 International Symposium on Intelligent Multimedia Video and Speech Processing., Hong Kong, May 2-4, 2001.
Ellison, et al., "Telerounding and Patient Satisfaction Following Surgery", pp. 523-530.
Fels, "Developing a Video-Mediated Communication System for Hospitalized Children", Telemedicine Journal, vol. 5,vol. 5, No. 2, 1999.
Fetterman, "Videoconferencing over the Internet", Internet, 2001, pp. 1-8.

(56) References Cited

OTHER PUBLICATIONS

Fiorini, P., et al, "Health Care Robotics: A Progress Report", IEEE International Conference on Robotics and Automation, Apr. 1997, pp. 1271-1276.

Ghiasi, et al., "A Generic Web-based Teleoperations Architecture: Details and Experience", SPIE Conference on Telemanipulator and Telepresence Technologies VI, Sep. 1999.

Goldberg, et al., "Collaborative Teleoperation via the Internet", IEEE International Conference on Robotics and Automation, San Francisco, California, Apr. 2000.

Goldberg, "Desktop Teleoperation via the World Wide Web, Proceedings of the IEEE International Conference on Robotics and Automation", htto://citeseer.ist.osu.edu/cache/oaoers/cs/5/fto:zSzzSzusc.eduzSzoubzSziriszS zraiders.odf/aol, 1995, pp. 654-659.

Goldberg, "More Online Robots, Robots that Manipulate", Internet, Updated Aug. 2001, http://ford.ieor.berkeley.edu/ir/robots_a2.html, Aug. 2001.

Goldenberg, et al., "Telemedicine in Otolaryngology", American Journal of Otolaryngology vol. 23, No. 1, 2002, pp. 35-43.

Goldman, Lea, "Machine Dreams", Entrepreneurs, Forbes, May 27, 2002.

Gump, Michael D., "Robot Technology Improves VA Pharmacies", Internet, 2001, pp. 1-3.

Hameed, Mohammed et al., "A Review of Telemedicine", Journal of Telemedicine and Telecare., vol. 5, Supplement 1, 1999, pp. S1:103-S1:106.

Han, et al., "Construction of an Omnidirectional Mobile Robot Platform Based on Active Dual-Wheel Caster Mechanisms and Development of a Control Simulator", Kluwer Acedemic Publishers, vol. 29, Nov. 2000, pp. 257-275.

Handley, et al., "RFC 2327—SDP:Session Description Protocol", http://www.faqs.org/rfcs/rfc2327.html, Apr. 1998.

Hanebeck, et al., "Roman: A mobile Robotic Assistant for Indoor Service Applications", Proceedings of the 1997 IEEE/RSJ International Conference on Intelligent Robots and Systems, 1997.

Harmo, et al., "Moving Eye-Interactive Telepresence Over Internet With a Ball Shaped Mobile Robot", 2000.

Haule, et al., "Control Scheme for Delayed Teleoperation Tasks", Proceedings of the Pacific Rim Conference on Communications, Computer and Signal Processing, May 17, 1995.

Hees, William P., "Communications Design for a Remote Presence Robot", Jan. 14, 2002.

Holmberg, "Development of a Holonomic Mobile Robot for Mobile Manipulation Tasks", International Conference on Field and Service Robotics, Pittsburgh, PA, Aug. 1999.

Int'l Communication Union, "ITU-T H.323 Packet-based multimedia communications", http://www.itu.int/rec/T-REC-H.323-199802-S/en, Feb. 1998.

Ishiguro, "Integrating a Perceptual Information Infrastructure with Robotic Avatars: A Framework for Tele-Existence", Proceeding of IEEE Conference on Intelligent Robots and Systems, 1999, pp. 1032-1038.

Ishihara, et al., "Intelligent Microrobot DDS (Drug Delivery System) Measured and Controlled by Ultrasonics", IEEE/RSJ, vol. 2, Nov. 3-5, 1991, pp. 1145-115.

Ivanova, Natali, "Master's thesis: Internet Based Interface for Control of a Mobile Robot", Department of Numerical Analysis and Computer Science, 2003, 59 pages.

Jenkins, et al., "Telehealth Advancing Nursing Practice", Nursing Outlook, vol. 49, No. 2, Mar./Apr. 2001.

Johanson, "Supporting video-mediated communication over the Internet", Chalmers University of Technology,Dept of Computer Engineering, Gothenburg, Sweden, 2003.

Jouppi, et al., "Mutually-Immersive Audio Telepresence", Audio Engineering Society Convention Paper presented at 113th Convention, Oct. 2002.

Jouppi, Norman et al., "First Steps Towards Mutually-Immersive Mobile Telepresence", CSCW, 02, New Orleans LA, Nov. 16-20, 2002.

Kanehiro, Fumio et al., "Virtual Humanoid Robot Platform to Develop Controllers of Real Humanoid Robots without Porting", IEEE, 2001, pp. 3217-3276.

Keller, et al., "Raven Interface Project", http://upclose.lrdc.pitt.edu/people/louw_assets/Raven_Slides.pps, Fall 2001.

Khatib, "Robots in Human Environments", Proc. International Conference on Control, Automation, Robotics, and Vision ICRACV2000, Singapore, Dec. 2000, pp. 454-457.

Kuzuoka, et al., "Can the GestureCam Be a Surrogate?", Proceedings of the Fourth European Conference on Computer-Supported Cooperative Work, Sep. 10-14, pp. 181-196.

Lane, "Automated Aides", Newsday, http://www.cs.cum.edu/nursebot/web/press/nd4380.htm, Oct. 17, 2000.

Lee, et al., "A novel method of surgical instruction: International telementoring", Internet, 1998, pp. 1-4.

Lim, Hun-Ok et al., "Control to Realize Human-like Walking of a Biped Humanoid Robot", IEEE, 2000, pp. 3271-3276.

Linebarger, John M. et al., "Concurrency Control Mechanisms for Closely Coupled Collaboration in Multithreaded Virtual Environments", Presence, Special Issue on Advances in Collaborative VEs, 2004.

Loeb, et al., "Virtual Visit: Improving Communication for Those Who Need It Most", Stud Health Technol Inform.; 94: 2003 pp. 302-308.

Long, "HelpMate Robotics, Inc. (Formerly Transitions Research Corporation) Robot Navigation Technology", NIST Special Publication, http://www.atp.nist.gov/eao/sp950-1/helpmate.htm, Mar. 1999, pp. 950-951.

Luna, Nancy, "Robot a new face on geriatric care", OC Register, Aug. 6, 2003.

Mack, "Minimally invasive and robotic surgery", Internet IEEE, 2001, pp. 568-572.

Mair, "Telepresence—The Technology. And Its Economic and Social Implications", IEEE Technology and Society, 1997.

Martin, Anya, "Days Ahead", Assisted Living Today, vol. 9, Nov./Dec. 2002, pp. 19-22.

McCardle, et al., "The challenge of utilizing new technology in design education", Internet, 2000, pp. 122-127.

Meng, et al., "E-Service Robot in Home Healthcare", Proceedings of the 2000 IEEE/RSJ, International Conference on Intelligent Robots and Systems, 2000, pp. 832-837.

Michaud, "Introducing Nursebot", The Boston Globe, http://www.cs.cmu.edu/nursebot/web/press/globe_3_01/index.html, Sep. 11, 2001, pp. 1-5.

Montemerlo, "Telepresence: Experiments in Next Generation Internet", CMU Robotics Institute, http://www.ri.cmu.edu/creative/archives.htm (Video/Transcript), Oct. 20, 1998.

Murphy, "Introduction to AI Robotics", A Bradford Book, 2000, p. 487.

Nakajima, et al., "A Multimedia Teleteaching System using an Electronic Whiteboard for Two Way Communication of Motion Videos and Chalkboards", IEEE, 1993, pp. 436-441.

Nomadic Technologies Inc., "Nomad XR4000 Hardware Manual", Release 1.0, Mar. 1999.

Nt'l Energy Res Sci Comp Ctr, "Berkeley Lab's RAGE Telepresence Robot Captures R&D100 Award", http://www.nersc.gov/news/newsroom/RAGE070202.php, Jul. 2, 2002.

Ogata, et al., "Development of Emotional Communication Robot: WAMOEBA-2r—Experimental evaluation.", IEEE, 2000, pp. 175-180.

Ogata, et al., "Emotional Communication Robot: WAMOEBA-2R—Emotion Model and Evaluation Experiments", Internet, 1999, pp. 1-16.

Oh, et al., "Autonomous Battery Recharging for Indoor Mobile Robots", Proceedings of Australian Conference on Robotics and Automation, http://users.rsise.anu.edu.au/rsl/rsl_papers/ACRA2000/Auto_Recharge_Paper.pdf, 2000.

Ojha, A. K., "An application of Virtual Reality in Rehabilitation", IEEE, Apr. 10-13, 1994, pp. 4-6.

Paulos, et al., "A World Wide Web Telerobotic Remote Environment Browser", http://vive.cs.berkeley.edu/capek, 1995.

(56) References Cited

OTHER PUBLICATIONS

Paulos, "Designing Personal Tele-embodiment", IEEE International Conference on Robotics and Automation http://www.prop.org/papers/icra98.pdf, 1998.
Paulos, "PRoP: Personal Roving Presence", ACM:CHI Proceedings of CHI '98, http://www.prop.org/papers/chi98.pdf, 1998, p. 6.
Paulos, et al., "Ubiquitous Tele-embodiment: Applications and Implications", International Journal of Human Computer Studies, vol. 46, No. 6, Jun. 1997, pp. 861-877.
Paulos, "Video of PRoP 2 at Richmond Field Station", www.prop.org Printout of Home Page of Website and two-page Transcript of the audio portion of said PRoP Video, May 2001.
Paulos, Eric J., "Personal Tele-Embodiment", UC Berkeley, Fall 2001.
Pin, et al., "A New Family of Omnidirectional and Holonomic Wheeled Platforms for Mobile Robots", IEEE, vol. 10, No. 4, Aug. 1994.
Rovetta, et al., "A New Telerobotic Application: Remote Laparoscopic Surgery Using Satellites and and optical fiber Networks for Data Exchange", International Journal of Robotics Research, Jun. 1,1996, pp. 267-279.
Roy, et al., "Towards Personal Service Robots for the Elderly", Internet, Mar. 7, 2002, 7 pgs.
Salemi, et al., "MILO: Personal robot platform", Internet, 2005, pp. 1-6.
Sandt, Frederic et al., "Perceptions for a Transport Robot in Public Environments", IROS, 1997.
Schaeffer, "Care-O-bot: A System for Assisting Elderly or Disabled Persons in Home Environments", Proceedings of AAATE-99, http://morpha.de/download/publications/IPA, 1999.
Schulz, "Web Interfaces for Mobile Robots in Public Places", Robotics & Automation Magazine, IEEE, vol. 7, Issue 1, Mar. 2000.
Shimoga, et al., "Touch and force reflection for telepresence surgery", IEEE, 1994, pp. 1049-1050.
Siegwart, "Interacting Mobile Robots on the Web", Proceedings of the 1999 IEEE International Conference on Robotics and Automation, May 1999.
Simmons, "Xavier: An Autonomous Mobile Robot on the Web", IEEE Robotics and Automation Magazine, 1999, pp. 43-48.
Spawar Systems Center, "Robart", San Diego, CA, http://www.nosc.mil/robots/land/robart/robart.html, 1998, pp. 1-8.
Stephenson, Gary, "Dr. Robot Tested at Hopkins", Internet, Aug. 5, 2003, pp. 1-2.
Stoianovici, et al., "Robotic Tools for Minimally Invasive Urologic Surgery", Internet, Dec. 2002, pp. 1-17.
Suplee, "Mastering the Robot", The Washington Post, http://www.cs.cmu.edu-nursebotlweb/press/wash/index.html, Sep. 17, 2000, p. A01.
Tahboub, Karim A. et al., "Dynamics Analysis and Control of a Holonomic Vehicle With Continously Variable Transmission", Journal of Dynamic Systems, Measurement and Control ASME vol. 124, Mar. 2002, pp. 118-126.
Tendick, et al., "Human-Machine Interfaces for Minimally Invasive Surgery", IEEE, 1997, pp. 2771-2776.
Thrun, et al., "Probabilistic Algorithms and the Interactive Museum Tour-Guide Robot Minerva", Internet, 2000, pp. 1-35.
Tzafestas, et al., "VR-based Teleoperation of a Mobile Robotic Assistant: Progress Report", Internet, Nov. 2000, pp. 1-23.
Urquhart, Kim , "InTouch's robotic Companion 'beams up' healthcare experts", Medical Device Daily, vol. 7, No. 39, Feb. 27, 2003, p. 1,4.
Weiss, et al., "Telework and video-mediated communication: Importance of real-time, interactive communication for workers with disabilities", California State University Northridge http://www.csun.edu/cod/conf/1999/proceedings/session0238.html, pp. 1-4.
West, et al., "Design of Ball Wheel Mechanisms for Omnidirectional Vehicles with Full Mobility and Invariant Kinematics", Journal of Mechanical Design, vol. 119, Jun. 1997, pp. 153-161.
Yamasaki, et al., "Applying Personal Robots and Active Interface to Video Conference Systems", Internet, 1995, pp. 243-248.
Yamauchi, "PackBot: A Versatile Platform for Military Robotics", Internet, 2004, pp. 1-10.
Yong, et al., "Robot task execution with telepresence using virtual reality technology", Internet, 1998, pp. 1-8.
Zamrazil, Kristie, "Telemedicine in Texas: Public Policy Concerns", House Research Organization Focus Report, Texas House of Representatives, http://www.hro.house.state.tx.us/focus/telemed.pdf, May 5, 2000, pp. 76-22.
Zipperer, Lorri, "Robotic dispensing system", 1999, pp. 1-2.
Zorn, Benjamin G., "Ubiquitous Telepresence", http://www.cs.colorado.edu/-zorn/utlvision/vision.html, May 5, 1996.
Kaplan, A. E. et al., "An Internet Accessible Telepresence", {aek keshav nls jhv}@research.att.com, AT&T Bell Laboratories, Murray Hill, N.J., pp. 1-7 1197 (1997).
Kuzuoka, et al., "Can the GestureCam Be a Surrogate?", Proceedings of the Fourth European Conference on Computer-Supported Cooperative Work, Sep. 1995, pp. 181-196.

\* cited by examiner

MOBILE ROBOT FOR TELECOMMUNICATION

CROSS REFERENCE TO RELATED APPLICATIONS

This U.S. patent application is a continuation of, and claims priority under 35 U.S.C. §120 from, U.S. patent application Ser. No. 14/041,325, filed on Sep. 30, 2013, which is a continuation of U.S. patent application Ser. No. 13/562,315, filed on Jul. 31, 2012 (now U.S. Pat. No. 8,577,501), which is a continuation of patent application Ser. No. 11/862,197, filed on Sep. 27, 2007 (now U.S. Pat. No. 8,265,793), which claims priority under 35 U.S.C. §119(e) to U.S. Provisional Patent Application 60/974,404, filed on Sep. 21, 2007, and U.S. Provisional Patent Application No. 60/895,740, filed Mar. 20, 2007. The disclosures of these prior applications are considered part of the disclosure of this application and are hereby incorporated by reference in their entireties.

The entire contents of U.S. Patent Application Publication 2007/0198128 to ZIEGLER, published Aug. 23, 2007, and of International Patent Application Publication WO 2007/041295 A2 to CROSS, published Apr. 12, 2007, are hereby incorporated by reference in their entireties.

TECHNICAL FIELD

This disclosure relates to mobile robots for telecommunications.

BACKGROUND

Robots have been used for facilitating videoconferencing and remote communication. For example, U.S. Pat. No. 7,123,285 to SMITH (the entire contents of which are incorporated herein by reference) relates to a system including a robot having a swiveling video monitor, a speaker and a microphone, and a remote terminal unit having a microphone and a camera. In accordance with SMITH, a user at the remote terminal unit can operate the robot while voice and video signals are sent to the robot to be output on the robot's speaker and video monitor. The swiveling video monitor of the robot in SMITH can also be operated via the remote terminal unit.

Patent Application Publication 2006/0082642 to WANG, published Apr. 20, 2006 (the entire contents of which are incorporated herein by reference), a robot is used for two-way mobile teleconferencing between the robot and a remote control station. The remote control station of WANG communicates with the robot through a network, receiving video input from a camera on the robot, and the user at the remote control station can move the robot using the remote control station.

As another example, robots have also been used for companionship and remote care giving. A mobile robot capable of facilitating telecommunication between a remote caregiver and a person in a home or other location, inter alia, is disclosed in US Patent Application Publication 2007/0192910 to VU, published Aug. 16, 2007 (which is incorporated herein by reference).

In order for the remote user to operate a mobile robot located in a home, building, or other location (such locations herein referred to as "premises") distant from the remote user's location, a communicative channel is provided therebetween. Typically, at the premises where the mobile robot is located, there may be public telecommunication service connections that may be used as the communicative channel; such as, for example, the public switched telephone network ("PSTN"), cable television ("cable"), satellite television ("satellite"), and/or campus wireless Ethernet services ("Wi-Fi"). At the remote user's location, which may be a home, an office, or a hotel, inter alia, there may be similar connectivity. Alternatively, the remote user may have access to mobile telephone-type service (such as GSM, COMA, 3G, or the like) over which Internet communication is provided. Thus, one approach for connecting a remote terminal to a mobile robot is via an Internet protocol using universal datagram packet (UDP), transmission control protocol (TCP), and/or interact protocol (IP).

However, because many homes having a broadband connection to the Internet utilize a firewall or a network address translation system (hereinafter, "NAT") collectively referred to as a "firewall" hereinafter-difficulties can occur when the remote terminal attempts to connect to the mobile robot. One such difficulty arises because many firewalls prevent direct connections initiated by Internet hosts not protected by the firewall (hereinafter, "outside hosts") to reach hosts located behind (i.e., protected by) the firewall (hereinafter, a "firewalled host"). Therefore, when the mobile robot is a firewalled host that is sequestered from incoming Internet connections originating beyond the firewall, it may not be possible for the remote terminal to initiate a direct connection with the mobile robot.

STUN and TURN are technologies that enable some incoming Internet connection initiation requests to "traverse" the firewall or NAT and successfully connect to fire-walled hosts (see, for example, US Patent Application Publication 2007/0076729 A1 to TAKEDA, published Apr. 5, 2007; 2006/0209794 to BAE, published Sep. 21, 2006; and US Patent Application Publication 2007/0189311 A1 to KIM, published Aug. 16, 2007, each of which are incorporated herein by reference). Nonetheless, even employing STUN and/or TURN, some kinds of incoming connection attempts may fail to reach firewalled hosts in certain kinds of network arrangements using a firewall or NAT.

For these reasons, among other, there has remained significant unmet demand for connecting a remote terminal to a mobile robot at a home or other such premises.

SUMMARY

In view of the above, as well as other considerations, presently provided is a mobile robot for performing telecommunication and remote observation, inter alia. The mobile robot may include at least one sensor and a privacy controller for preventing operation of the sensor when the local user causes the robot to operate in a privacy mode. The sensor may include a camera and/or a microphone, for example. The mobile robot may further include a wireless network interface for communicating with a base station, and a communication controller for transmitting and receiving audio and/or video data, in which the communication controller controls the mobile robot so as to prevent transmission of data from the sensor when the mobile robot operates in the privacy mode.

The mobile robot may also be usable with an RC unit for operating the mobile robot locally via a wireless signal transmitted to the mobile robot. In accordance with another aspect, a robot system may include abuse station and a mobile robot, the base station including abase station wireless transceiver for communicating with the mobile robot via a local wireless connection and a premises Internet connection for interfacing with the Internet, the mobile robot including a robot wireless transceiver capable of communicating with the base station via the local wireless connection.

The present teachings provide a remote control unit configured to wirelessly control a mobile robot moving through an environment and having a robot camera. The remote control unit comprises a privacy button operable by a local user and configured to engage a privacy mode of the mobile robot, and a wireless transmitter configured to emit a wireless control signal to the mobile robot based on input from a keypad of the RC unit. The wireless control signal is configured to cause the robot camera to block the field of view of the robot camera such that the environment of the mobile robot is obscured when the privacy mode of the mobile robot is engaged.

The present teachings also provide a remote control unit configured to wirelessly control a mobile robot moving through an environment and having a robot camera. The remote control unit comprises an input device operable by a local user and configured to engage a privacy mode of the mobile robot, and a transmitter configured to emit a control signal to the mobile robot based on input from the input device of the remote control unit. The control signal is configured to cause the robot camera to change position to block the field of view of the robot camera such that the environment of the mobile robot is obscured when the privacy mode of the mobile robot is engaged.

The present teachings further provide a method of controlling a mobile robot having a robot camera comprises receiving an input at an input device of a remote control unit to engage a privacy mode of the mobile robot, emitting a control signal from the input device to engage the privacy mode, and, in response to receiving the emitted control signal to engage the privacy mode, moving the robot camera into a conspicuously disabled orientation.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 4:
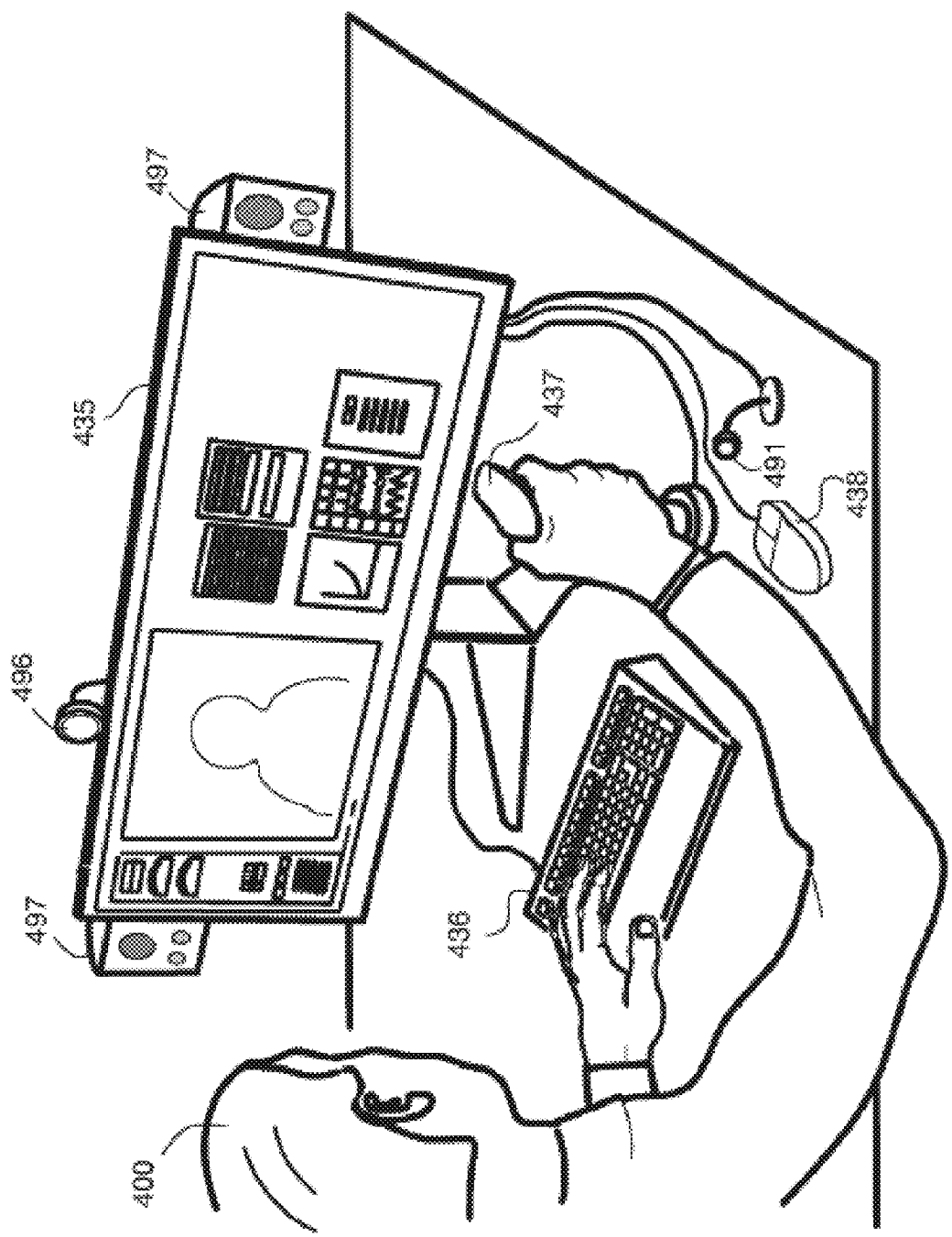
FIG. 4 is a perspective view of a remote user terminal.
Figure 5:
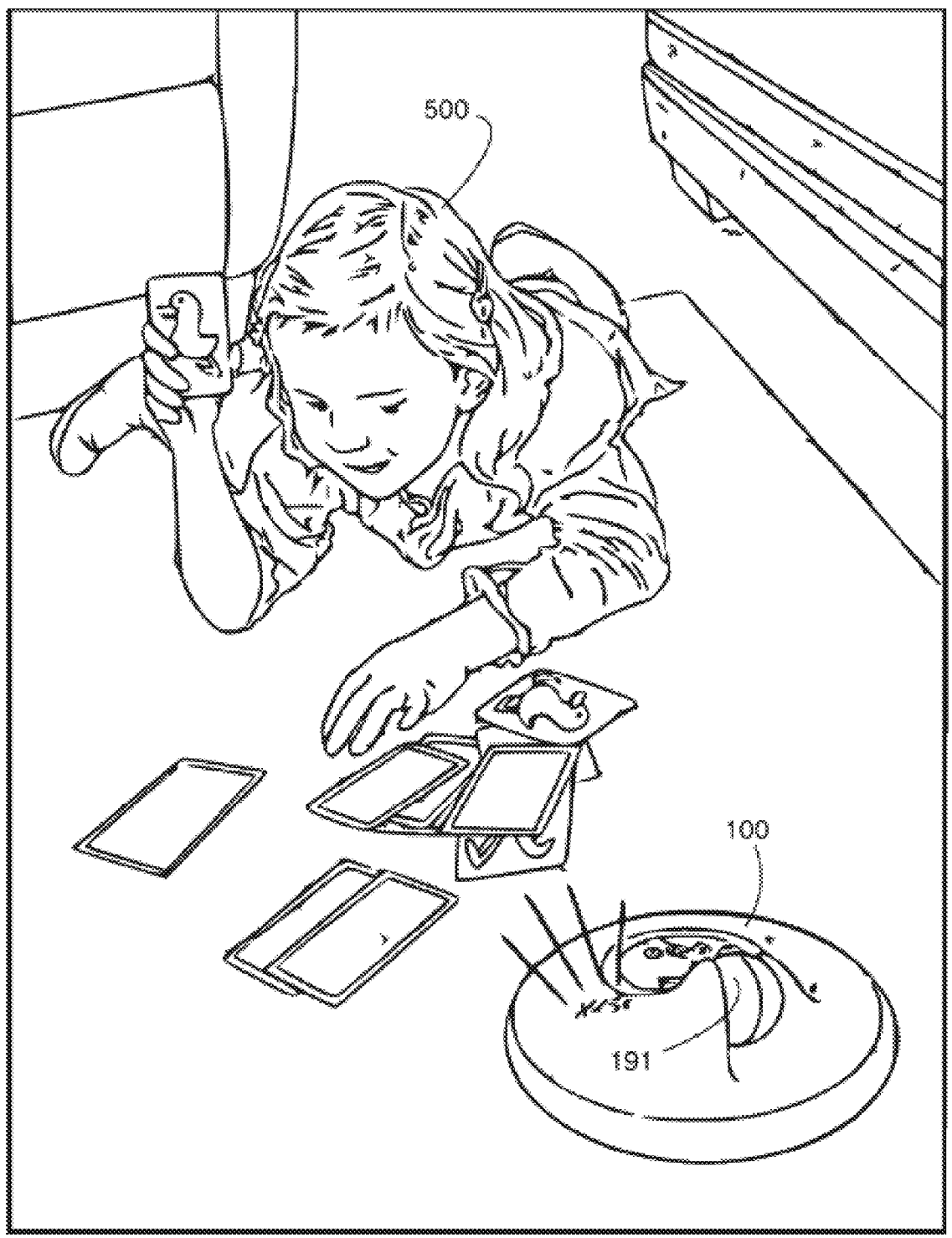
FIG. 5 is a perspective view of a mobile robot facilitating telecommunication with a local user.
Figure 6:
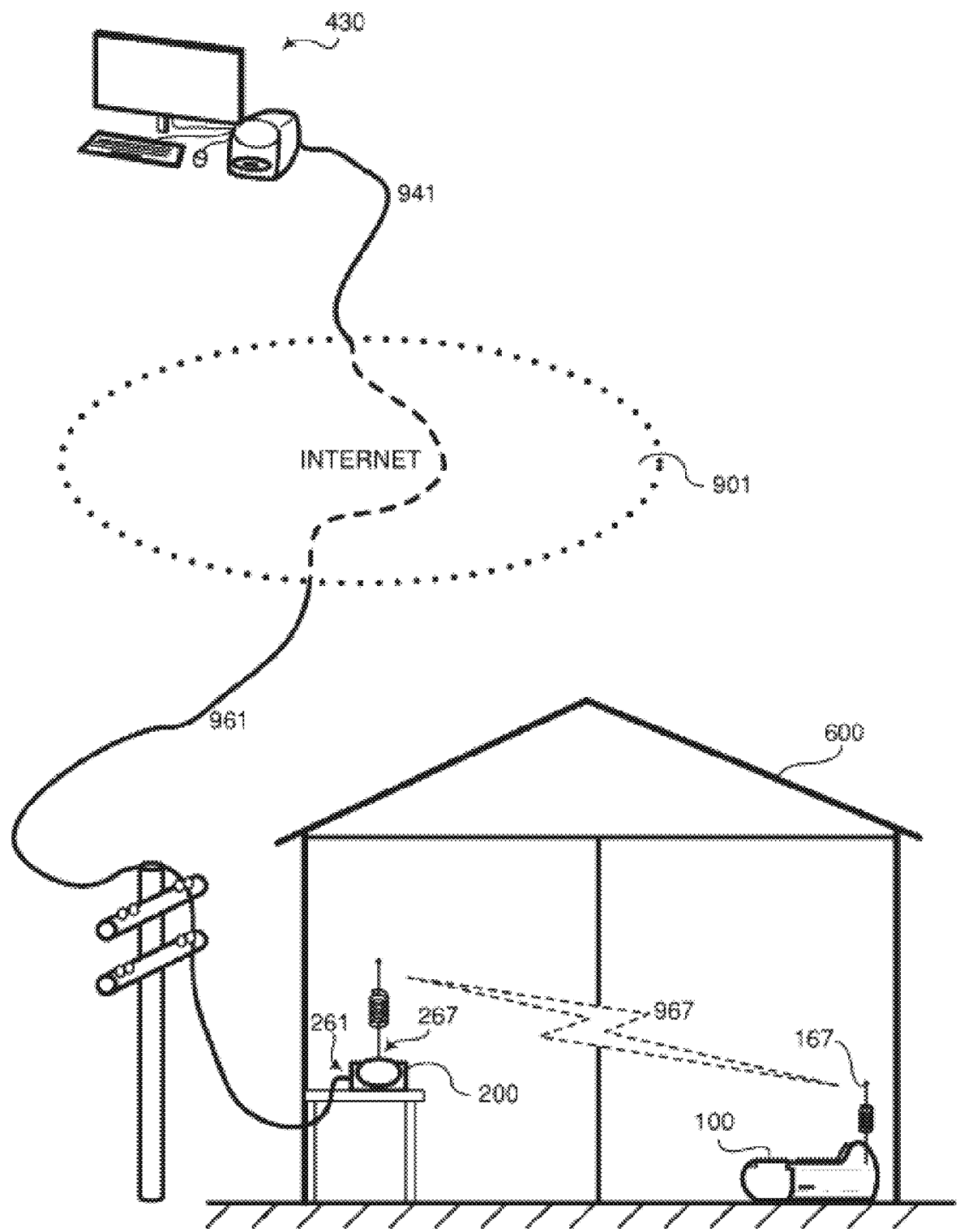
FIG. 6 is an illustrative diagram of a robot telecommunication system using peer-to-peer VoIP connection between a remote terminal and a mobile robot.

In accordance with a first example implementation, as illustrated in FIGS. 4, 5 and 6, a robot telecommunication system is provided including a mobile robot 100 at local premises 600 and a remote terminal 430 at a remote location, in which a remote user 400 can operate the mobile robot 100 using the remote terminal 430. The remote location may be located beyond at least one minute's walk from the mobile robot 100, in accordance with one example implementation; or, the remote location may be located at least 100 meters away from the mobile robot 100, in accordance with another implementation. Alternatively, the remote location may in fact be located quite near the mobile robot 100, in terms of physical distance-even within the same home or building, or the same room in accordance with another example implementation.

Figure 1:
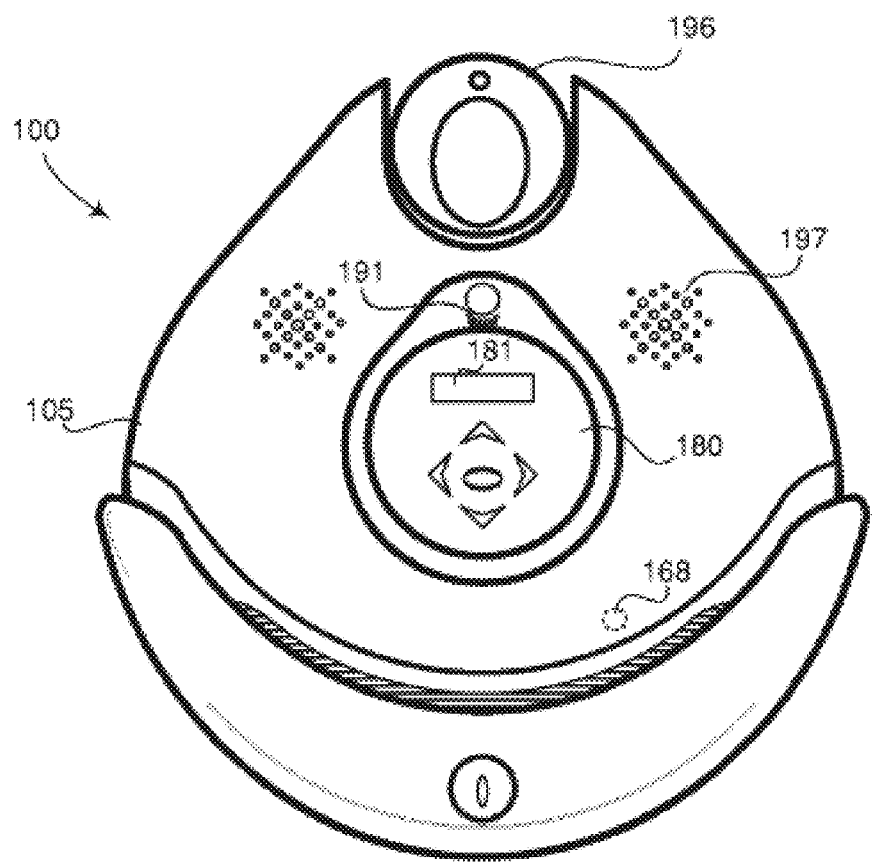
FIG. 1 is a plan view of a mobile robot.
Figure 2:
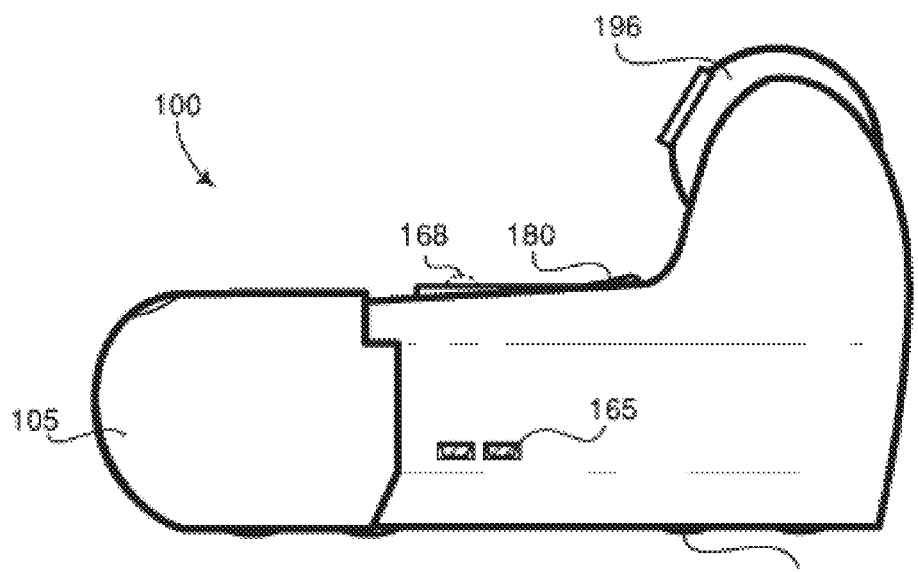
FIG. 2 is a profile view of the mobile robot shown in FIG. 1.

Referring to FIGS. 1 and 2 to illustrate an example implementation, the mobile robot 100 includes one or more telecommunication sensors, such as a robot microphone 193 for inputting voice or sound data, or a camera 191 for inputting image data. The sound data or image data originating from the robot's telecommunication sensors is referred to herein as "local telecommunication data." Preferably, the mobile robot 100 also includes one or more telecommunication output devices, such as a speaker 194 for outputting voice or sound data received from the remote terminal, or a liquid crystal display screen ("LCD") 181 for displaying image data received from the remote terminal 430. The sound or image data received from the remote terminal 430 is referred to herein as "remote telecommunication data."

The mobile robot may have a chassis 105 (also referred to herein as a main body) including a docking connector for interfacing with a base station or recharging station (also referred to herein as a "docking station"), and a user interface disposed on the chassis for interacting with a local user. Furthermore, the mobile robot 100 includes a drive system 130 for propelling and steering the mobile robot 100 in accordance with user input. In accordance with at least one example implementation, the mobile robot 100 may further include features similar to any of those discussed in ZIEGLER, VU, or SMITH, as well as any of the robots discussed below in reference to the other incorporated documents, such as with respect to the drive system, chassis, form factor, electronics, and/or other aspects.

In at least one implementation, as illustrated in FIG. 6, the robot system includes a base station 200 located at the local premises 600 within communicative range of the mobile robot 100, such as in a room 611A of a home. The base station 200 communicates with the Internet 901 via a premises Internet connection 961, such as a digital subscriber line ("DSL") or cable modem, and communicates with the mobile robot 100 using a local wireless connection 967 via a base station wireless transceiver 267. The local wireless connection 967 may include a radio-frequency ("RF") data. network protocol such as wireless Ethernet ("Wi-Fi") conforming to IEEE 802.11a, 802.11b, IEEE 802.11g, IEEE 802.11n, or other suitable standard, for example (see, for example, "Standard for Information Technology-Telecommunications and information exchange between systems-Local and metropolitan area networks-Specific Requirements-Part 11: Wireless LAN Medium Access Control (MAC) and Physical Layer (PHY)," published by IEEE, 1999, which is incorporated herein by reference.) The mobile robot 100 in this example correspondingly includes a robot wireless transceiver 167 for communicating with the base station 200.

The mobile robot 100 may also include a tether port 165 for connecting to the base station 200 using a wire or cable. The mobile robot 100 may additionally include software for enabling the local user 500 to set configurable features of the mobile robot 100, such as during an initial set-up phase when the mobile robot 100 is first used. In accordance with one example implementation, the tether port 165 includes an RJ45 port for connecting to the base station 200 using an Ethernet cable (e.g., unshielded twisted pair, "UTP"). In accordance with an alternative example, the tether port 165 includes a universal serial bus ("USB") port; and in another example implementation, an IEEE 1394-compatible port. The mobile robot 200 receives an IP address using DHCP and may be accessed using the HTTP protocol on a local network via the base station 200 and the tether port 165, in accordance with at least one example implementation.

As an advantage, during initial setup or subsequent re-setup, security settings (WU or RADIUS security codes, passwords, or the like) or other parameters for enabling the mobile robot 100 to communicate with the base station 200 via the local wireless connection 967 can be established using the wired tether port connection to the base station 200, and potential frustrations of wireless network setup may be alleviated.

Figure 22:
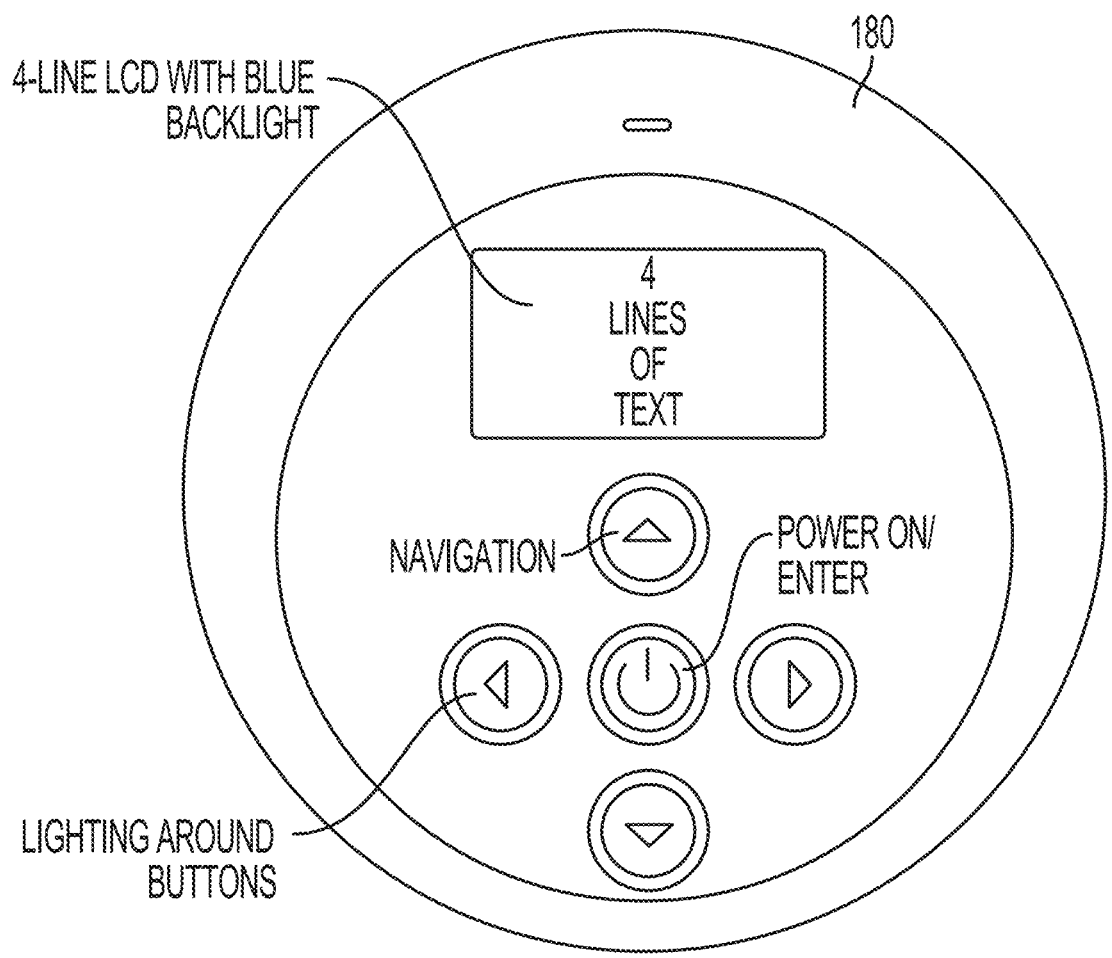
FIG. 22 is a perspective view of an example on-board user interface of a mobile robot.

In accordance with another example implementation, as illustrated in FIG. 22, the mobile robot 100 may include an on-board user interface 180 including an LED or LCD display 181 (which may include a seven-segment display, or a four-line character-based LCD display, as non-limiting examples), and an input device such as a keypad, as illustrated in FIG. 1. Initial setup of the mobile robot 100, such as establishing behavioral settings or wireless network parameters, inter alia, may be carried out by the local user 500 using the on-board user interface 180, without needing to use a personal computer, for example.

FIG. 4 illustrates a remote terminal 430 including a PC having a remote microphone 491 for inputting remote telecommunication data to be sent to the mobile robot 100 and a remote speaker 497 for outputting local telecommunication data received from the mobile robot 100. The remote terminal 430 may also include additional input hardware such as a remote camera and/or additional output hardware such as a remote display 435 (e.g., a computer monitor) for use with telecommunication. The remote o terminal communicates with the Internet 901 through a remote terminal Internet connection (such as, for example, cable modem, DSL transceiver, PPP over PSTN, Wi-Fi, T1, COMA, or GSM).

In addition to telecommunication data, the remote terminal 430 includes robot control input devices such as a keyboard 436, joystick 437, and/or mouse 438. The remote display 435 can display robot control data, such as robot telemetry, battery status, and the like. By manipulating the robot control input devices 436, 437, the remote user 400 causes the remote terminal 430 to transmit a robot control signal to the base station 200 via the Internet 901. The robot control signal may include commands instructing the mobile robot 100 to turn, to move forward, to cause a manipulator or effector to operate (e.g., such as commanding a robotic arm to grasp an object, or commanding a robot camera-aiming mechanism to change the viewing angle of the robot camera 196), or to perform other actions in accordance with remote user input.

The base station 200 may include a base station controller, such as a microprocessor or microcontroller, for intermediating and processing data exchanged between the remote terminal 430 and the mobile robot 100. The base station 200 receives the local telecommunication data sent from the mobile robot 100 via the local wireless connection 967. if the local telecommunication data is already encoded in accordance with a suitable protocol, the base station 200 may forward the local telecommunication without additional processing. Otherwise, if the local telecommunication data is not yet encoded, or is encoded in a format incompatible with the remote terminal 430, the base station 200 may then encode it using an appropriate media protocol (such as MPEG, WAV, AVI, Ogg Vorbis/Ogg Theora, etc.) and forward the encoded local telecommunication data to the remote terminal 430 over the Internet 901. Similarly, the base station 200 may receive remote telecommunication data from the remote terminal 430 via the premises Internet connection 961, perform decoding if the received data is not in a format or protocol compatible with the mobile robot 100, and then forward the remote telecommunication data to the mobile robot 100 using the local wireless connection 967.

Voice-over-IP ("VoIP") refers to technologies and standards for transmitting media (such as sound and/or video, inter alia) over data networks using Internet protocols. Examples of VoIP protocols include SKYPE, VONAGE, SIP, and ITU H.323 (see, for example, U.S. Patent Application Publication 2007/0153801A1 to SUNG, published Jul. 5, 2007, which is incorporated herein by reference). In some VoIP implementations (such as SKYPE and VONAGE, among others), Internet-based VoIP terminals (such as personal computers—"PCs"—running MAP software and having appropriate hardware such as a microphone and speaker, and/or a camera and video display; as well as VoIP-specific equipment such as SIP telephones) are assigned ENUM- or DUNDi-compatible telephone numbers, and can receive incoming telephone calls even from non-VOIP telephones operating on the PSTN. See, for example, the discussion of Skype set forth in US Patent Application Publication 2007/0159979 to BUTLER, published Jul. 12, 2007, the entire contents of which are incorporated herein by reference.

The local and remote telecommunication data may be encoded and exchanged using a VoIP protocol. For example, the mobile robot 100 and the remote terminal 430 may encode the local telecommunication data using a CODEC according to the Session Initiation Protocol ("SIP"; see, for example, RFC3261 published by the Internet Engineering Task Force). Alternatively, any other VoIP standard suitable for establishing connections and encoding data for exchange between Internet-connected telecommunication devices may be used, such as H.323 and/or related standards.

In addition, the robot control signal generated as a result of robot control input from the remote user 400 may also be encoded (or "piggybacked") using the same VoIP standard that is used to exchange the local and remote telecommunication data. In accordance with one example implementation, the remote terminal 430 may include a PC executing software for telecommunication in accordance with the SIP standard. While the remote telecommunication data generated from the remote microphone 491 and/or the remote camera are encoded using a CODEC (e.g., MPEG or WAY) and transported over the Internet 901 to the base station 200 and relayed to the mobile robot 100 as a first Real-Time Transport Protocol (RTP) data stream, the robot control signals input from the keyboard 436 and/or joystick 437 may also be transmitted using the same SIP session as a second RTP data stream, simultaneously.

As discussed, firewall or NAT devices can obstruct incoming Internet connection initiation requests and prevent them from reaching a firewalled host. However, NAT or firewall traversal may be accomplished for some VoIP protocols by opening a "pinhole" (also referred to as "hole-punch") port in the NAT or firewall. Typically, a VoIP session—such as an SIP stream—can then be "tunneled" through the NAT pinhole to reach the firewalled host. However, in some circumstances, a separate pinhole must be opened for each protocol or session that will be sent through the NAT or firewall; and in some cases, the number or type of pinholes that may be opened in the NAT or firewall may be limited. Accordingly, it can be advantageous to encode both the telecommunication data and the robot control signal using a common SIP session that is tunneled through a firewall pinhole. Or, as one alternative example implementation using the H.323 protocol, the remote telecommunication data may be encoded using a CODEC in accordance with a suitable standard (such as H.261, H.263, or H.264, inter alia) and transported to the mobile robot 100 over a first "channel" within the H.323 session; while a second H.323 channel is opened within the same H.323 session to transport the robot control signal.

As a further advantage, the remote user 400 may connect to the mobile robot 100 at the local premises 600 by simply calling a telephone number associated therewith, using a VoIP device such as a SIP phone or a PC, without having to necessarily use a specialized software application. Once the call connection IS established using the VoIP protocol, both the robot control signal and the telecommunication data can be exchanged with the mobile robot 100 via one common VOW session, as an example.

Figure 20:
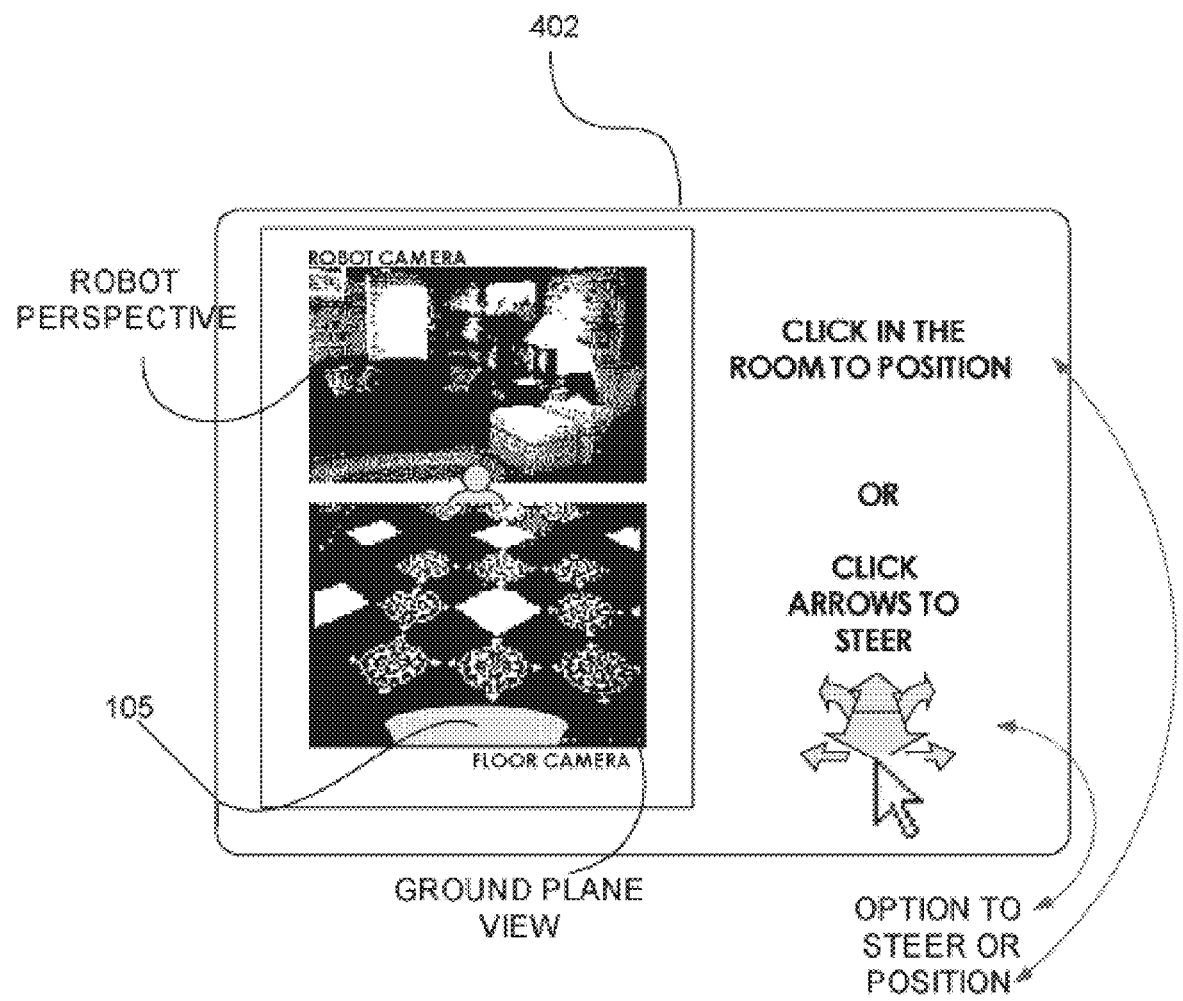
FIG. 20 is a diagram illustrating a first example user interface for controlling mobile robot.
Figure 21:
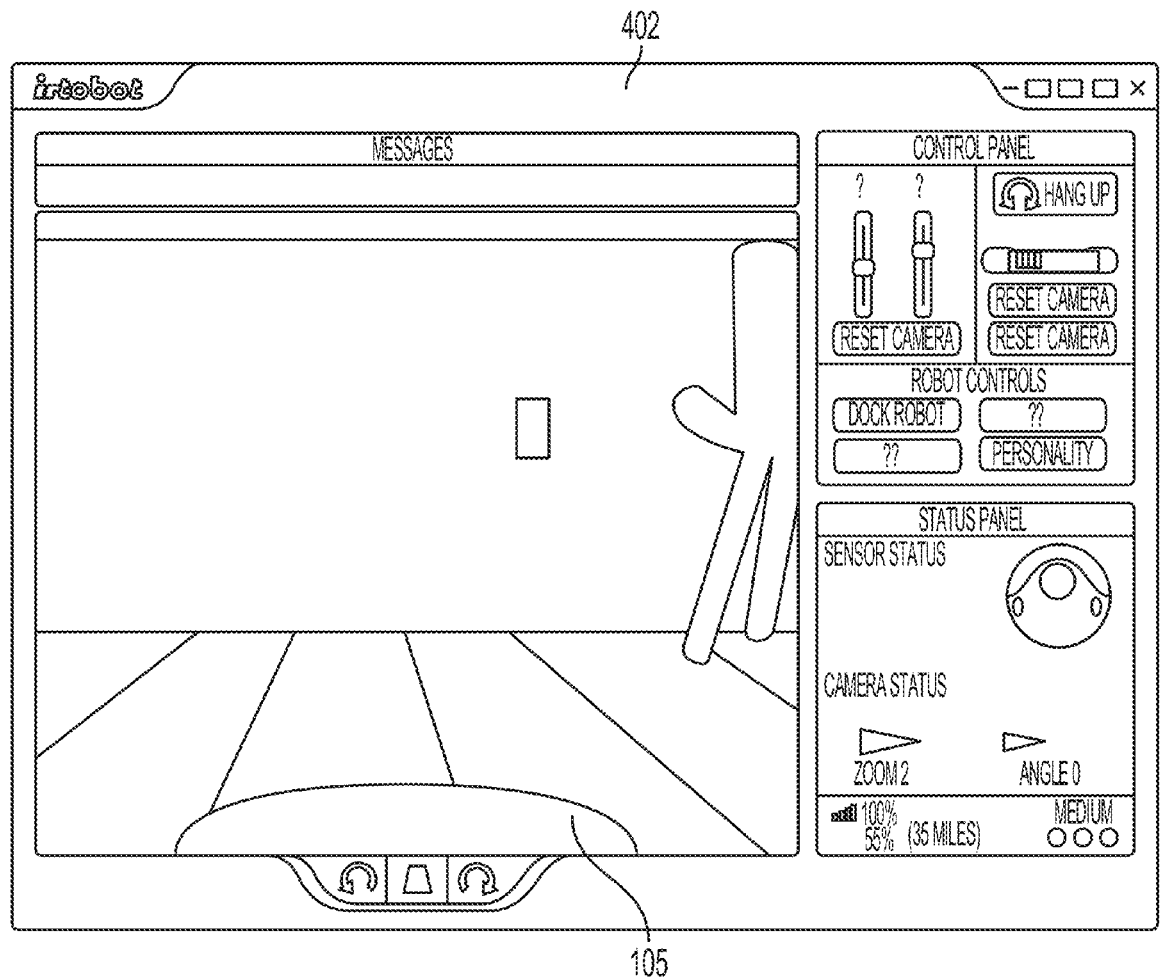
FIG. 21 is a diagram illustrating a second example user interface for controlling a mobile robot.

FIGS. 20 and 21 illustrate example user interfaces for display on a remote terminal 430. In FIG. 20, the user interface includes a video window for displaying the local video data received from the robot camera of the mobile robot 100, and a navigation input area for enabling the remote user 400 to control steering and mobility of the mobile robot 100 by clicking on arrows corresponding to directions. As illustrated in FIG. 21, the video window may include a navigation reference, such as a portion of the chassis 105 of the mobile robot 100, within the viewing area displayed in the video window. As a benefit, the remote user can ascertain size and perspective for judging speed of motion and/or potential obstacles when navigating the mobile robot 100.

Figure 3:
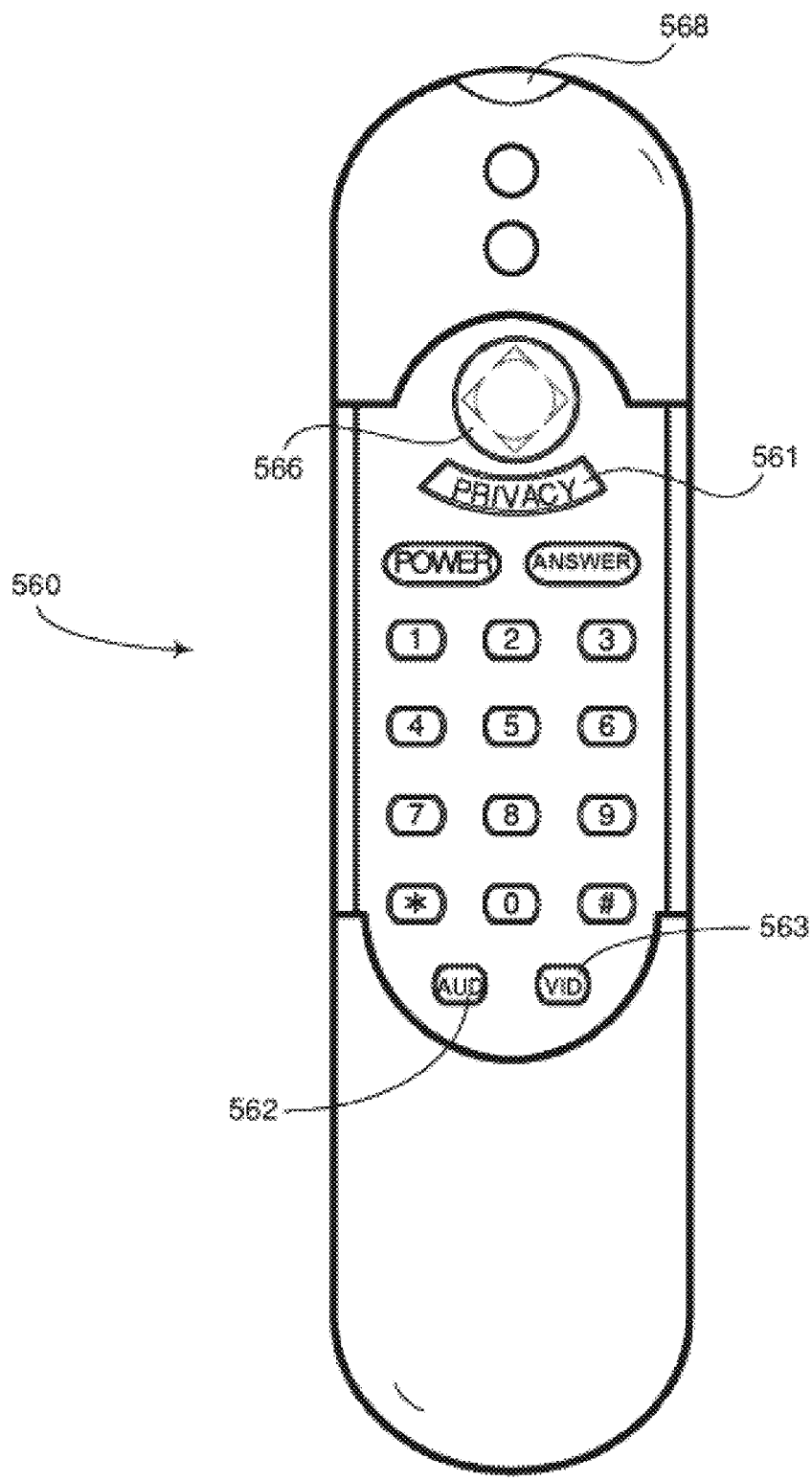
FIG. 3 is a plan view of an RC unit.

FIG. 3 illustrates an infrared local control wand, herein referred to as an "RC unit" 560, for enabling a local user 500 (see FIG. 5) to control the mobile robot 100 locally. The RC unit 560 may include a form factor and features for enabling the local user 500 to hold the RC unit 560 in his or her hand and operate one or more buttons 561, 562, 563 or other input mechanisms (such as pressure-sensing pads, a directional keypad 566, a joystick, or a touch-sensitive LCD screen, as non-limiting examples). A local control signal 968 is generated by the RC unit 560 based on the input from the local user 500 and transmitted to the mobile robot 100. In one example implementation, the RC unit 560 includes an RC transmitter 568 such as a light-emitting diode that emits light in the infrared spectrum ("infrared LED"), and which transmits the local control signal 968 encoded as a pattern of pulses of infrared light. The mobile robot 100 may include a corresponding local control receiver 168 (such as an infrared light sensor) for receiving the local control signal 968. As example alternatives, the RC transmitter 568 may include a radio-frequency transmitter and/or antenna, or an LED that emits light in the visible spectrum, inter alia. In accordance with one example implementation, the RC transmitter 568 includes a wireless transmitter that functions within the local user's line-of-sight.

Figure 17:
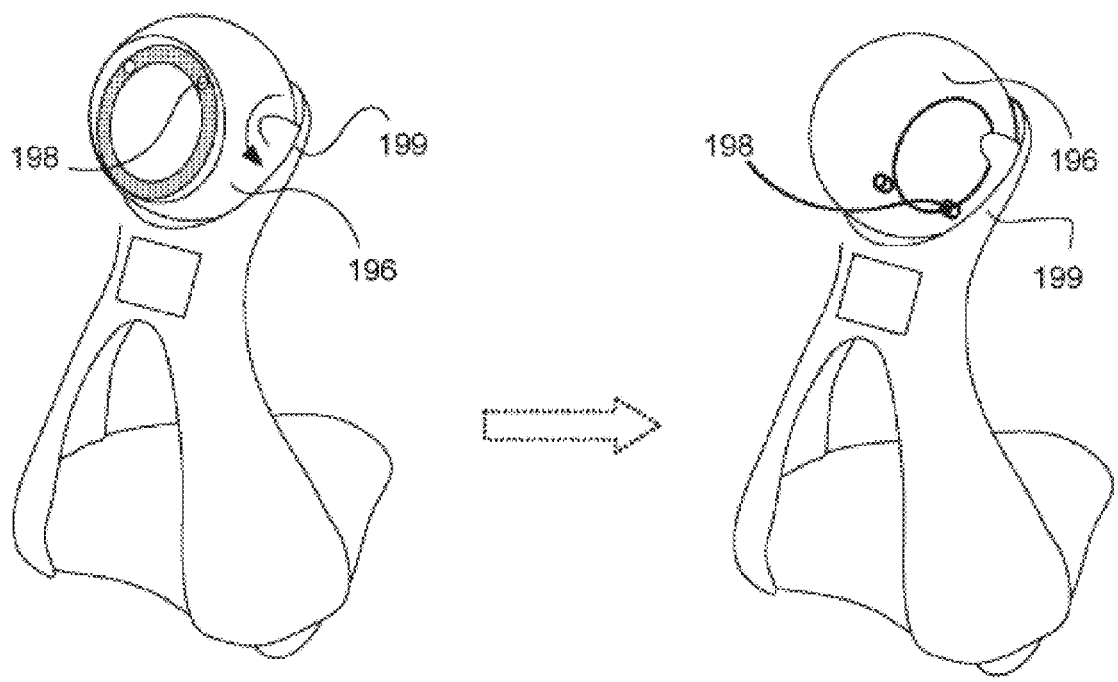
FIG. 17 is a perspective view of a robot camera in an active position.
Figure 18:
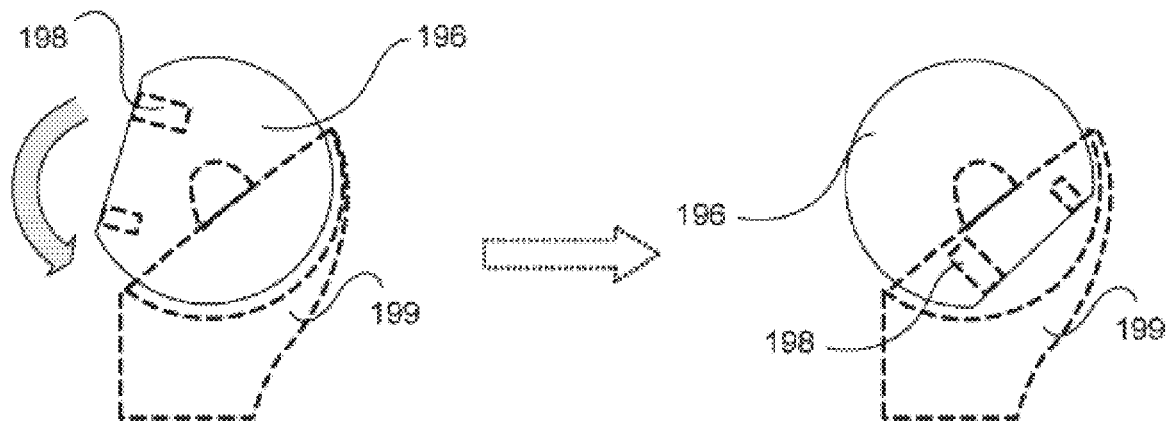
FIG. 18 is a perspective view of the robot camera of FIG. 17, in a disabled position.

The RC unit 560 may include a privacy button 561 for initiating a privacy mode of the mobile robot 100, and also may include an audio mute button 562 and a video mute button 563 for disabling audio or video telecommunication, respectively. When the mobile robot 100 receives a local control signal 968 indicating that the privacy button 561 has been operated, the mobile robot initiates the privacy mode by causing the robot camera 196 to move into a conspicuously disabled orientation, for example, and also by disabling the robot microphone 191 (see, for example, FIGS. 17 and 18). In one example implementation, the mobile robot 100 may also disable the speaker 197 when the privacy button 561 is operated. In another example implementation, the mobile robot 100 may not disable the robot microphone 191, but instead prevent any data generated by the robot microphone 191 from being transmitted to the remote terminal 430. The mobile robot may include a second robot camera for example. In accordance with at least one example implementation, as illustrated in FIGS. 17 and 18, the mobile robot may include a wide angle camera 196 for viewing a wide field around the mobile robot, and a narrow angle (or infrared) camera 198 for viewing a focused area around the mobile robot. The user may toggle the view between the wide angle camera 196 and the narrow angle camera 198, for example; or, the user interface may display data from both the wide and narrow angle cameras, as one alternative example.

The RC unit 560 may also enable the local user 500 to navigate the mobile robot 100 by operating a navigation control mechanism 566. Furthermore, the RC unit 560 may include a "call out" button to initiate outgoing telecommunication connections from the mobile robot 100. In one implementation, when a telecommunication session (e.g., a phone call) has ended, but the local user does not hit the "privacy" button within a particular span of time, then the mobile robot 100 automatically enters the privacy mode.

Figure 15:
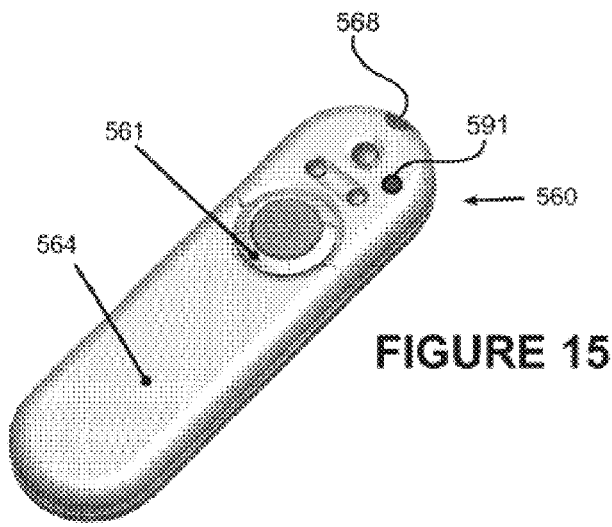
FIG. 15 is a perspective view of an RC unit having a sliding cover in the closed position.
Figure 16:
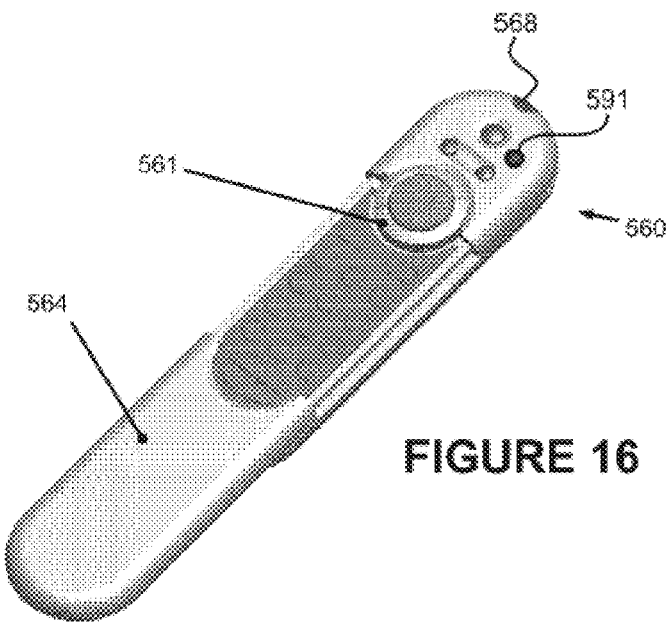
FIG. 16 is a perspective view of the RC unit of FIG. 15, having a sliding cover in the open position.

In one embodiment, as illustrated in FIGS. 3, 15 and 16, the RC unit includes a sliding cover 564 that can slide between an open position and a closed position. As shown in FIGS. 15 and 16, the privacy button 564 may be disposed in a location such that, and/or the sliding cover 564 may have a shape such that, the privacy button 564 remains exposed and/or operable by a user when the sliding cover 564 is open and also when the sliding cover 564 is closed. As an advantage, the user can quickly operate the privacy button 561 to engage the mobile robot's privacy mode even when the sliding cover 564 RC unit 560 is closed.

Figure 13:
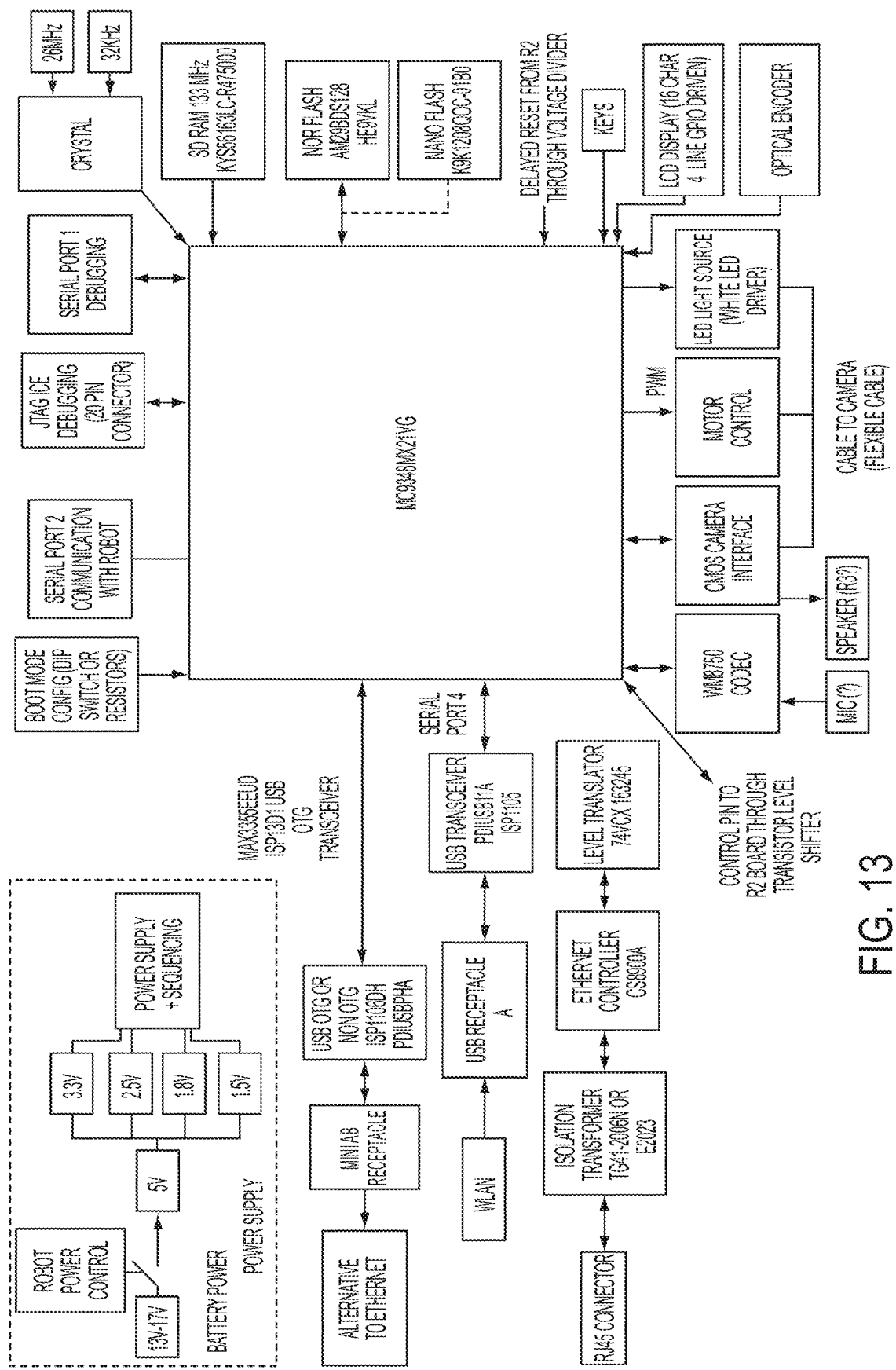
FIG. 13 is a schematic diagram of an example component organization of a mobile robot.

The mobile robot 100 may include a telecommunication processor having a microprocessor and a data store for storing robot control software (for example, a Pentium III processor and system board connected with SDRAM, a flash EEPROM, a hard disk drive, or other storage technology). The telecommunication processor may execute telecommunication software for encoding and decoding the VoIP protocol, and may also communicate with a robot system controller (such as, for a non-limiting example, a Roomba R2 controller) via an on-board link (such as an RS232-compatible serial line or USB or an IEEE-1394 connection), in which the system controller performs control of the drive system 130 and other actuators, for example. Also, the telecommunication processor may receive the remote telecommunication data and the robot control signal via the robot wireless transceiver 167, and additionally may receive the local control signal 968 via the local control receiver 168. FIG. 13 illustrates a component organization of a mobile robot in accordance with one example implementation.

When there is conflict between the commands issued by the remote user 400 and the local user 500, the telecommunication processor may arbitrate between the two users by selecting which commands to suppress based on a rule set or priority allocation, for example.

In accordance with at least one example implementation, the telecommunication processor preferentially selects robot control commands from the local user 500 (and discards or ignores robot control commands from the remote user 400) when there is conflict between the local user's commands and the remote user's commands. For example, when the remote user 400 commands the mobile robot 100 to turn right but the local user 500 commands the mobile robot 100 to turn left, the mobile robot 100 would turn left i.e., obeying the local user's command white ignoring the remote user's command. Alternatively, the telecommunication processor may instead always select the robot control commands from the remote user 400. As another alternative implementation, the mobile robot 100 may permit operation of the privacy button 561 on the RC unit 560 to always override any conflicting command received from the remote terminal 430. As a result, apprehension or privacy concerns on the part of potential users of the robot system may be relieved.

In addition, when the audio mute button 562 is operated on the RC unit 560, the mobile robot 100 may then disable local audio data from being transmitted, while permitting local video data to be communicated to the remote terminal 430. Also, when the video mute button 563 is operated on the RC unit 560, the mobile robot 100 may prevent local video data from being transmitted, while permitting local audio data to be sent to the remote terminal 430.

FIG. 6 illustrates a robot telecommunication system using a peer-to-peer ("P2P") VoIP protocol, in which the base station 200 and the remote terminal 430 are connected to the internet 901 and both have unique, globally-accessible IP addresses, without a firewall or NAT interposed between the base station 200 or remote terminal 430. In this example implementation, when the remote user 400 operates the remote terminal 430 to connect to the mobile robot 100, the remote terminal initiates a VoIP session with the base station 200 on whichever port is typically used by the VoIP protocol. The telecommunication data may be sent via the directly established VoIP session. Furthermore, the robot control signal from the remote terminal 430 may "piggyback" on the VOW session; or alternatively, it may instead be transmitted on a second port or separate, unrelated data stream.

Figure 8:
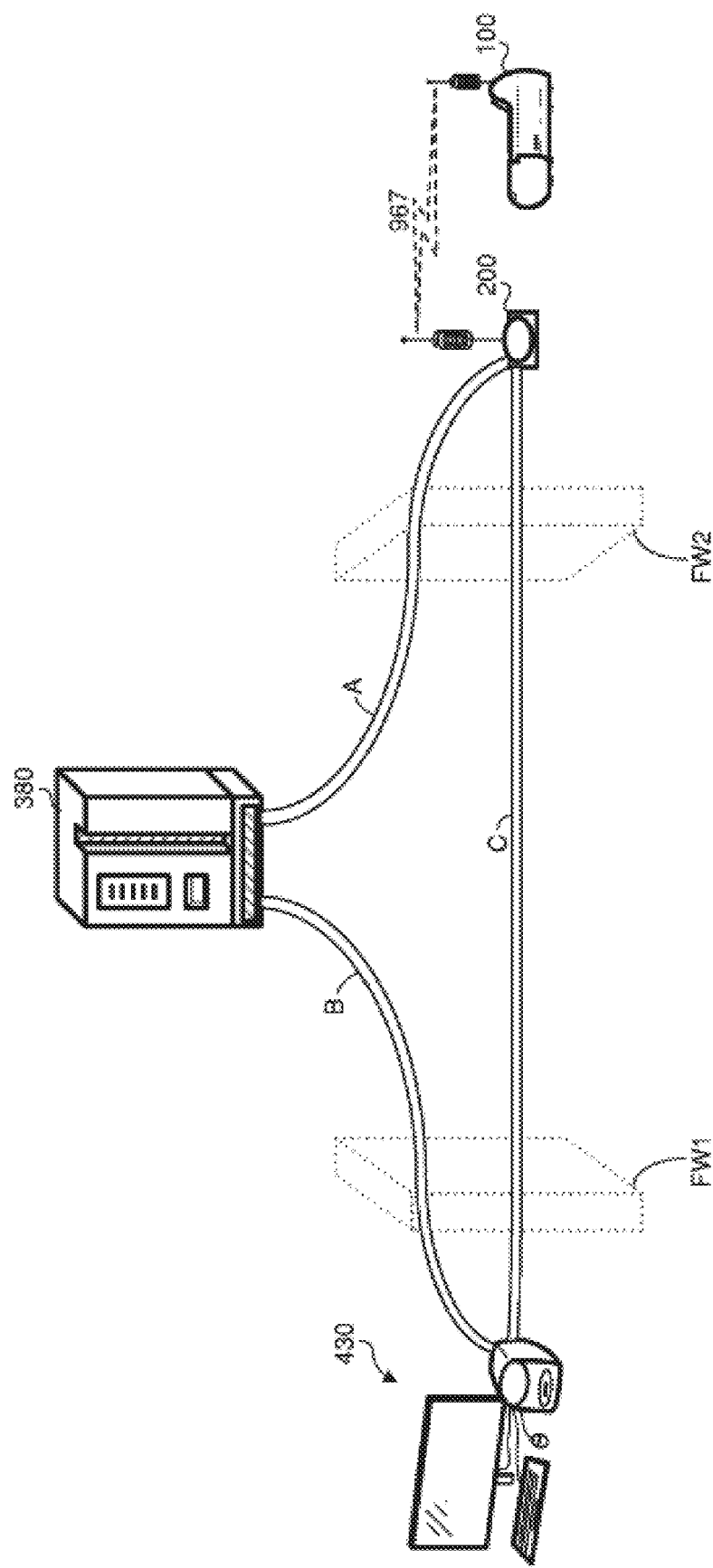
FIG. 8 is a schematic diagram of a robot telecommunication system using direct peer-to-peer VoIP connections.

Although networks in which each Internet-connected host is associated with a unique, globally accessible IP address have grown less common, particularly in home networks, this network configuration nonetheless may function in accordance with the present example. As shown schematically in FIG. 8, direct IP connections are possible between the remote terminal 430 and the base station 200 over link C.

Figure 7:
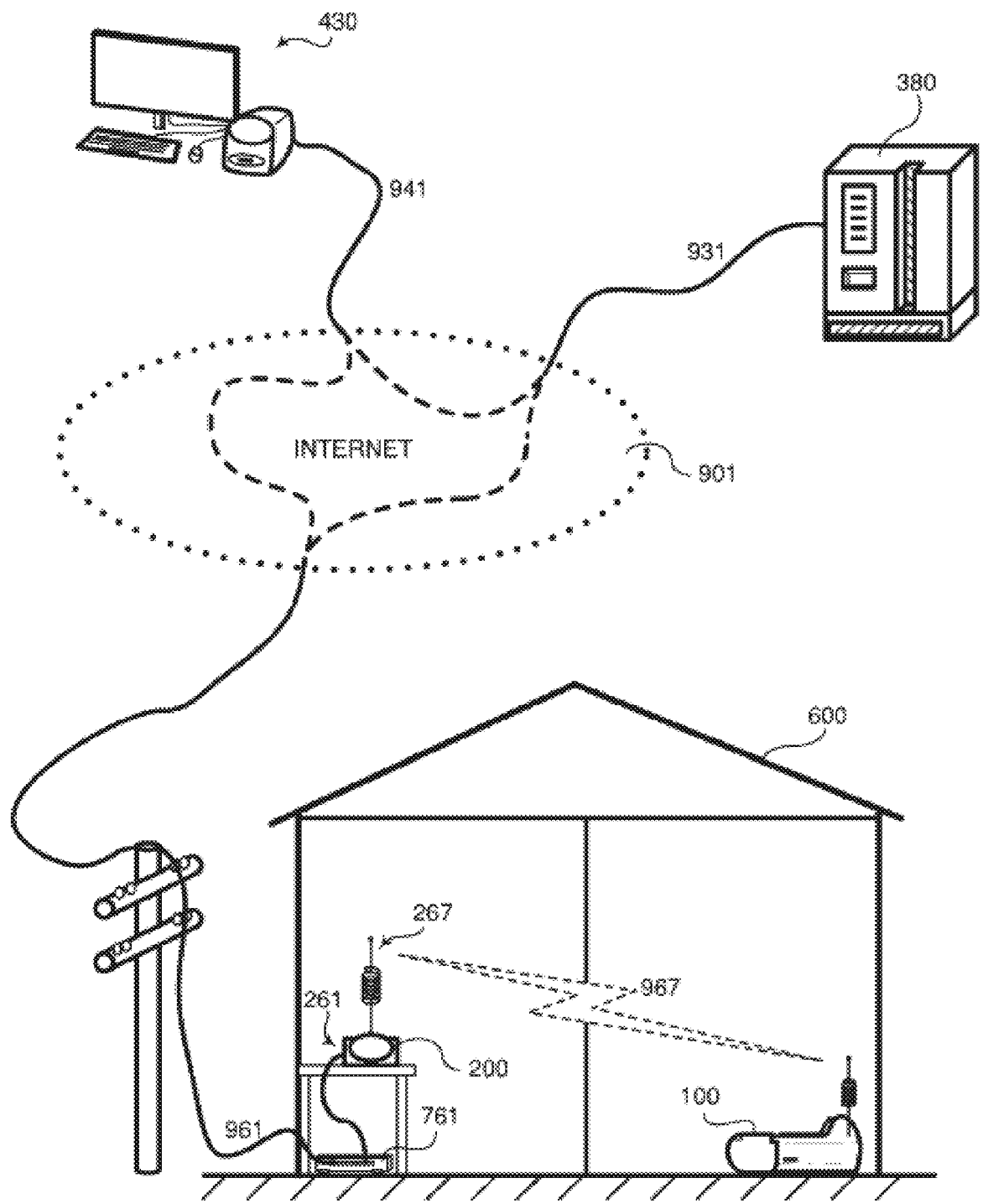
FIG. 7 is an illustrative diagram of a robot telecommunication system using peer-to-peer VoIP connection between a remote terminal and a mobile robot facilitated by an Internet server.

FIG. 7 illustrates another example implementation of a robot telecommunication system, in which a P2P-type VoIP system is used that includes at least one Internet server 380 having a globally accessible IP address. In this example, it is not necessary for the remote terminal 430 or the base station 200 to have a unique, globally-accessible IP address; rather, the remote terminal 430 may be directly connected to the Internet, or may be behind a "cone" NAT; and the base station 200 is connected through a "cone"-type NAT router 761. The NAT router 761 has two IP addresses: the first is a unique, globally accessible IP address used to communicate with Internet hosts via the local premises Internet connection 961, and the second is a non-globally accessible "private" IP address (such as, for example, 192.168.0.1). The NAT router 761 may in turn assign a non-globally accessible private IP address to the base station 200 using DHCP (alternatively, the base station may have a pre-established private IP address). When the base station 200 transmits IP packets addressed to an Internet host while using the NAT router 761 as an P gateway, the NAT router 761 re-transmits the base station's outgoing IP packets to the Internet 901 using the NAT routers own unique, globally accessible IP address. For this reason, from the perspective of Internet hosts that are unaware of the base station's NAT status, the base station 200 has an apparent IP address that is the same as the IP address of the NAT router 761.

Figure 9:
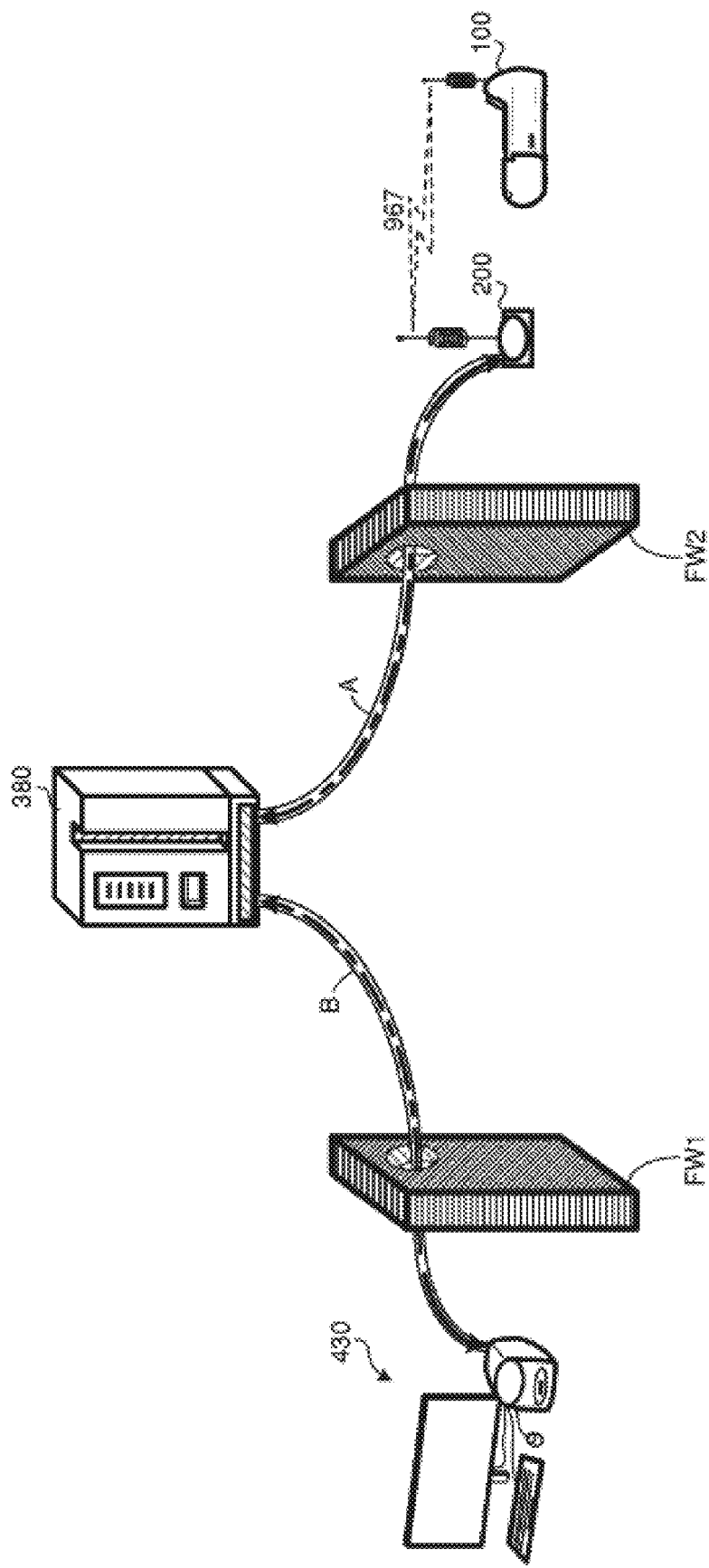
FIG. 9 is a schematic diagram of a robot telecommunication system using peer-to-peer VoIP connections, where the remote terminal and the mobile robot are both behind separate NATs.

As illustrated in FIG. 9, both the remote terminal 430 and also the base station 200 maintain separate connections B, A with the Internet server 380, through respective firewalls FW1 and FW2, that were originally initiated from the respective hosts (since it is not possible for the Internet server 380 to initiate a connection to firewalled hosts such as the base station 200 or remote terminal 430 in this example). When the remote user 400 wants to connect to the mobile robot 100, the remote terminal 430 notifies the Internet server 380 via connection B. When the remote terminal 430 and the base station 200 connect to the Internet server 380, the Internet server 380 may determine the nature of any NAT or firewall status for the hosts (using, e.g., STUN, TURN, or another suitable method for network examination) and determine each connecting host's apparent IP address. The Internet server 380 then notifies the base station 200 via connection A that the remote terminal 430 requests to connect to the base station 200, also informing the base station 200 of the remote terminal's apparent global IP address.

Figure 14:
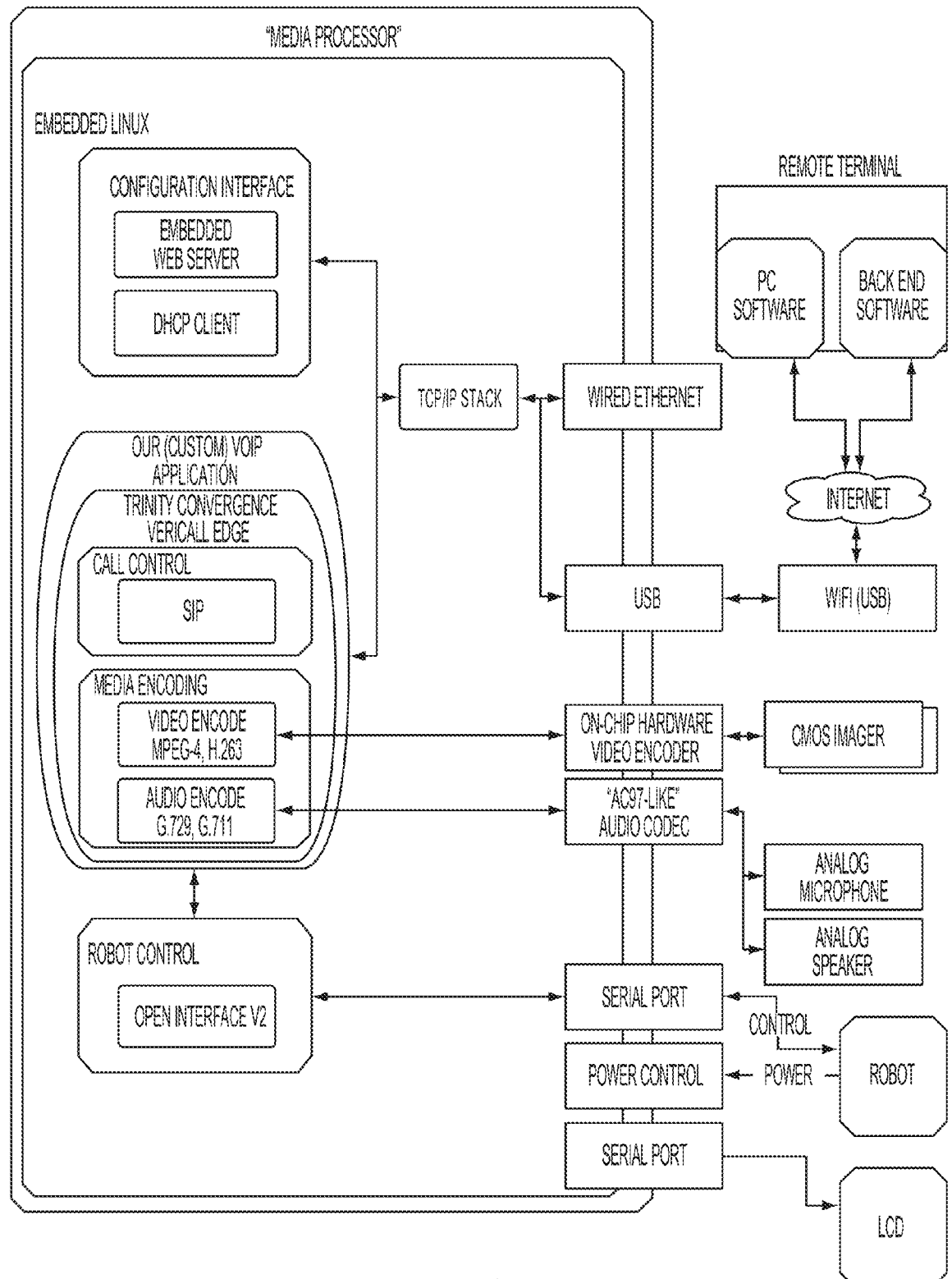
FIG. 14 is a schematic diagram of a software organization of a mobile robot.

FIG. 14 illustrates a possible software organization of a mobile robot system in accordance with at least one example implementation. The VoIP protocol and integration of the remote telecom data signal and the robot control signal into a single VoIP data stream may be performed using a software product such as, for example, VeriCall Edge (see, for example, U.S. Pat. No. 6,985,480 to BROWN, issued Jan. 10, 2006, which is incorporated herein by reference). The robot system may include a media processor, for example.

Figure 10:
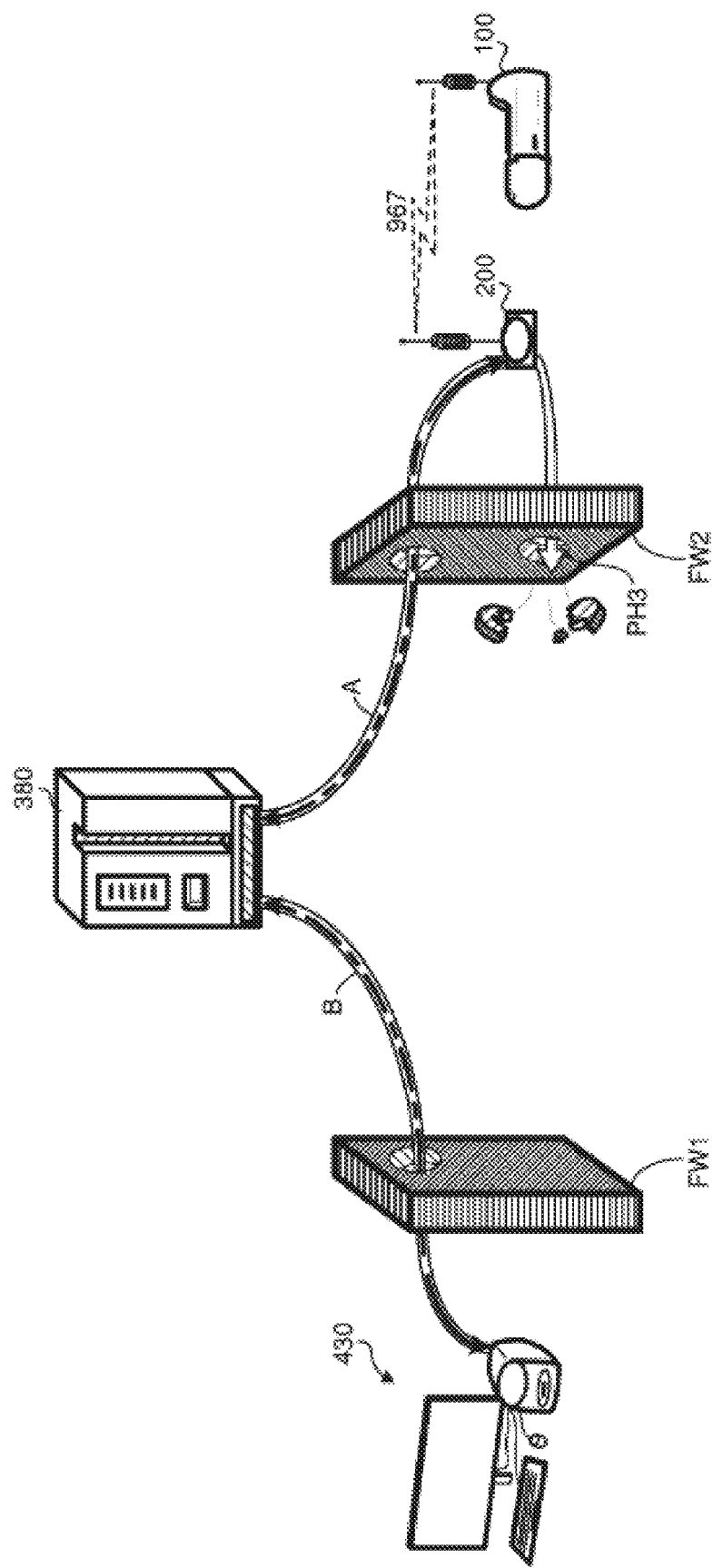
FIG. 10 is a schematic diagram of a robot telecommunication system using peer-to-peer VoIP connections, where the base station is opening a pinhole in the base station's NAT.
Figure 11:
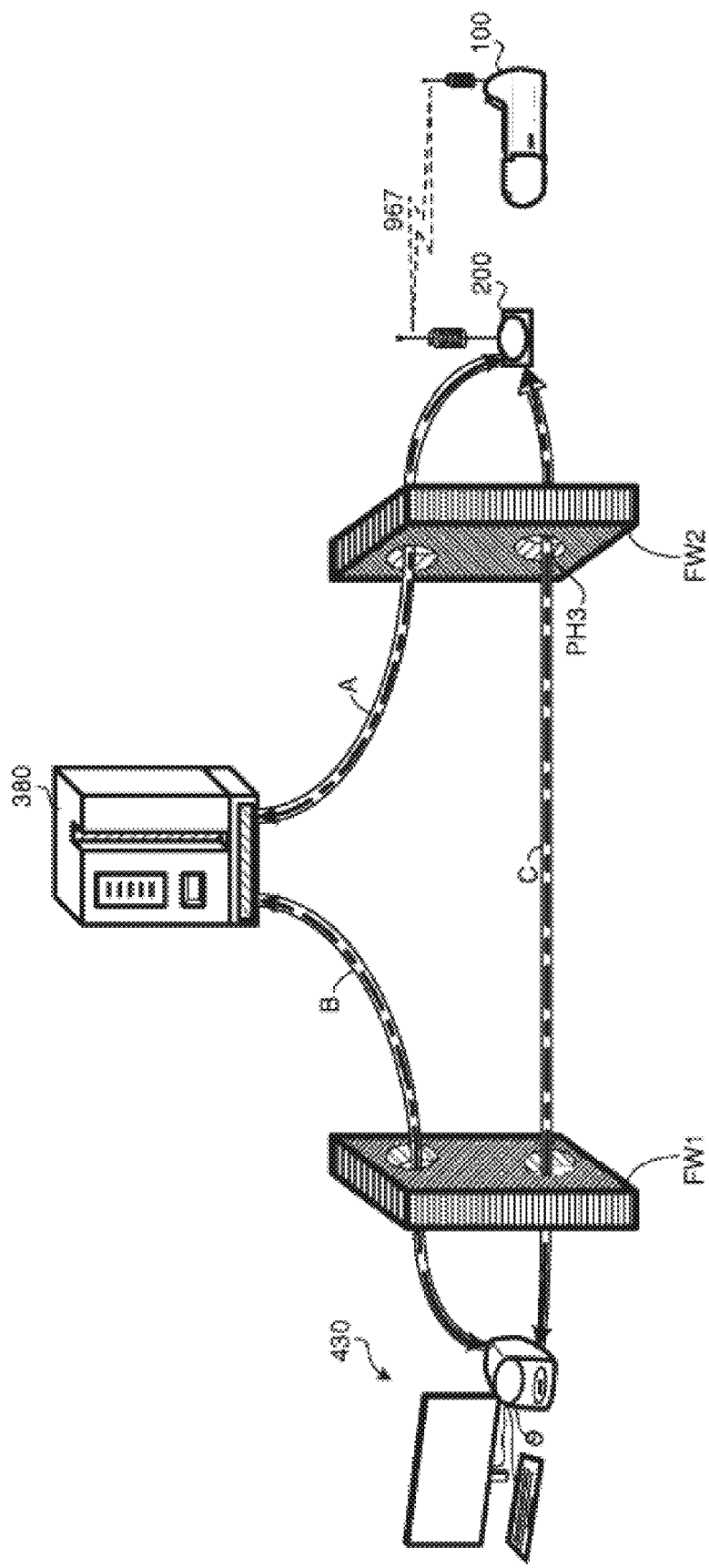
FIG. 11 is a schematic diagram of the robot telecommunication system using peer-to-peer VoIP connections shown in FIG. 10, where the remote terminal connects to the base station through the pinhole opened in the base station's NAT.

The base station 200 then opens pinhole PH3 on a particular UDP port of the base station's NAT by sending an outgoing connection packet to the remote terminal's apparent IP address, as shown in FIG. 10. As illustrated in FIG. 11, the remote terminal 430 then connects to the base station 200 by establishing connection C through the pinhole PH3.

In some network arrangements such as when a symmetric NAT is interposed between the remote terminal 430 and the base station 200 it may not be possible to determine which apparent IP address or port the remote terminal 430 will have, and therefore it may not be possible for the base station 200 to open an appropriate pinhole through which the remote terminal 430 can connect. Nonetheless, it may be possible for the remote terminal 430 and the base station 200 to communicate over the P2P VoIP protocol by employing a relay or TURN server.

Figure 12:
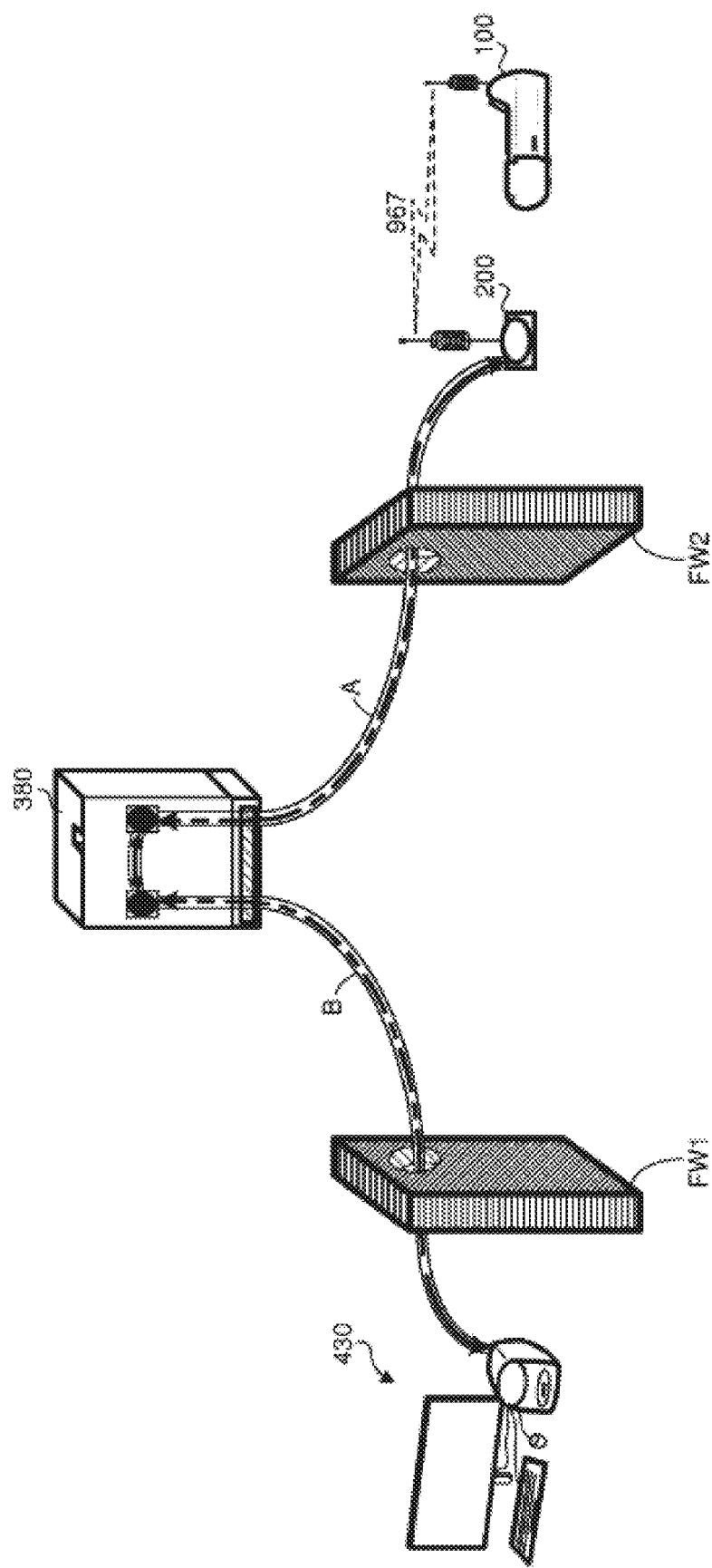
FIG. 12 is a schematic diagram of a robot telecommunication system using an Internet server operating as a relay server for a VoIP connection between the remote terminal and the mobile robot.

In accordance with the exemplary implementation shown in FIG. 12, the Internet server 380 functions as a relay server to enable VoIP data to be exchanged between the remote terminal 430 and the base station 200. In this example implementation, the Internet server 380 first determines the NAT status of the remote terminal 430 and the base station 200 when they first connect to the Internet server 380. The Internet server 380 then determines an optimal connection strategy and coordinates the hosts to effect the VoIP connection.

As one example, when the Internet server 380 determines that the remote terminal 430 and the base station 200 are both behind "cone" NATs, the Internet server 380 may determine that the optimal connection strategy is for the base station 200 to open a pinhole (e.g., PH3 shown in FIG. 11) and for the remote terminal 430 to connect through the pinhole. Alternatively, if the Internet server 380 detects a symmetric NAT between the remote terminal 430 and the base station 200, it may determine that use of a relay or TURN server is necessary.

Then, for example, in an implementation using a SKYPE network, the Internet server 380 may designate a "super node" (e.g., a node that is not behind a NAT or firewall) for the hosts to use as a relay server. As illustrated in FIG. 12, the Internet server 380 itself may also function as a relay server, for example (alternatively, the relay server may be another Internet host separate from the Internet server 380). When communicating via a relay server, there need not be any direct connection between the remote terminal 430 and the base station 200.

Poor quality of service ("QoS") may affect the ability of the remote user 400 to effectively control the mobile robot 100 and/or to conduct effective telecommunication with the local user 500. Accordingly, the Internet server 380 may measure and/or monitor QoS of the VoIP connection between the remote terminal 430 and the mobile robot 100, and may select relay servers (or connection strategy recommendations) based on the QoS metric. For example, when the VoIP protocol being used is SIP, the Internet server 380 may measure QoS using the RTCP protocol. If the QoS is determined to be poor, then the Internet server 380 may notify the remote terminal 430 and the base station 200 to attempt to connect via a different relay server or to attempt a different connection strategy.

Figure 26:
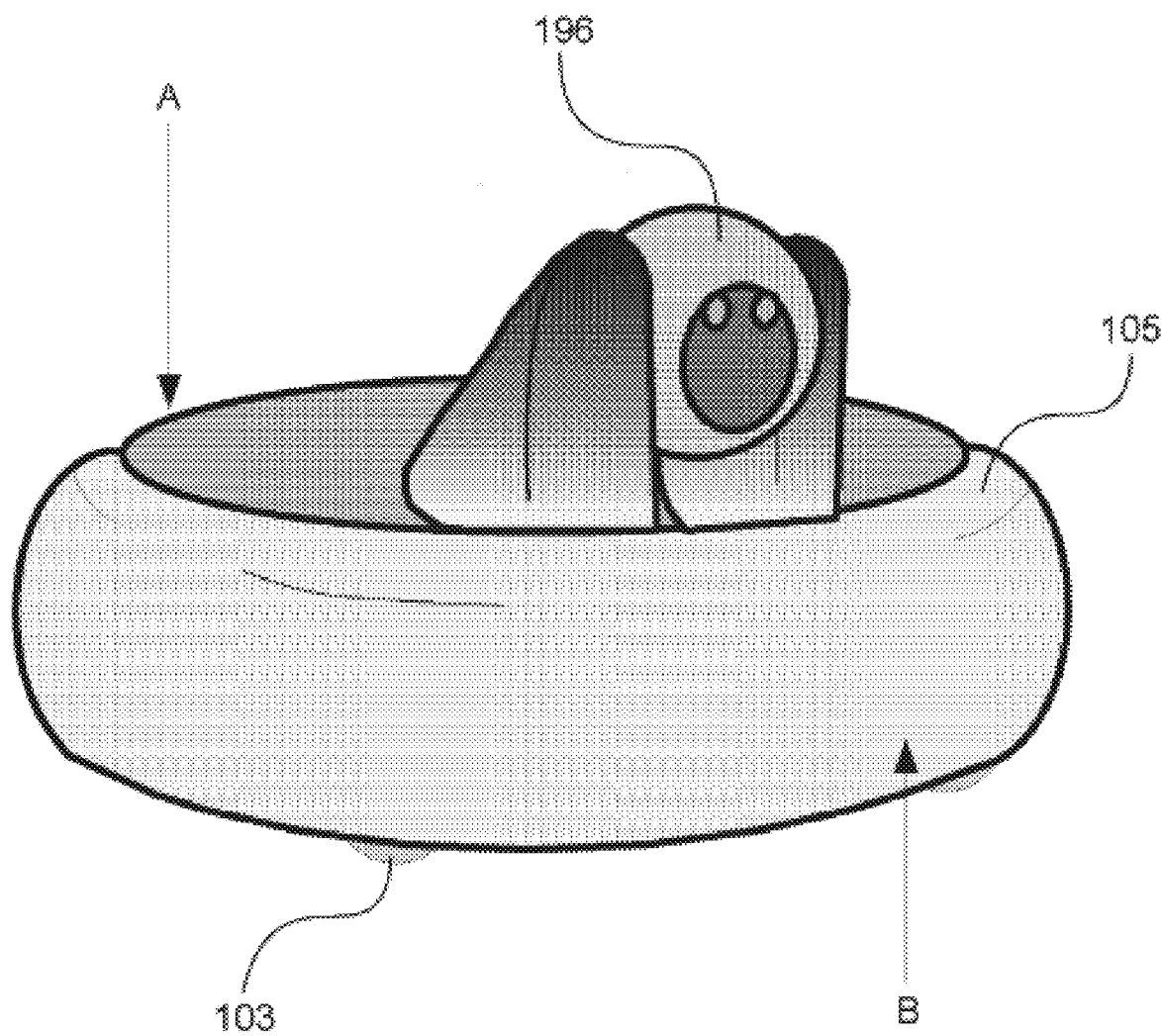
FIG. 26 is a perspective view of a mobile robot having a rotatable, reversible robot camera.

FIG. 26 shows an example implementation of a mobile robot 100 having a rotatable robot camera 196 mounted on a turret, in which the robot camera 196 is rotatable from a forward-facing position (the forward direction of the chassis 105 being indicated by the arrow "A") to a rear-facing position (the rear direction of the chassis 105 being indicated b the arrow "B"). In accordance with at least one implementation, the rotatable robot camera 196 is operable even when rotated to the rear-facing position (see FIG. 26).

When the mobile robot 100 having this type of robot camera 196 is recharging or connected to a base station 200, the mobile robot 100 may typically be oriented such that the front end "A" of the chassis 105 faces a wall or is obstructed from rotating the chassis 105. Yet the mobile robot 100 can still enable a remote user 400 to receive local image data from the rotatable robot camera 196, as illustrated in FIG. 26, by rotating the robot camera 196 so as to face the rearward direction "B".

In accordance with one example implementation, when the robot camera 196 flips by 180 degrees so as to switch between the forward-facing and rearward-facing directions, the mobile robot 100 automatically adjusts the output signal to compensate for the flipped view of the robot camera 196.

Figure 23:
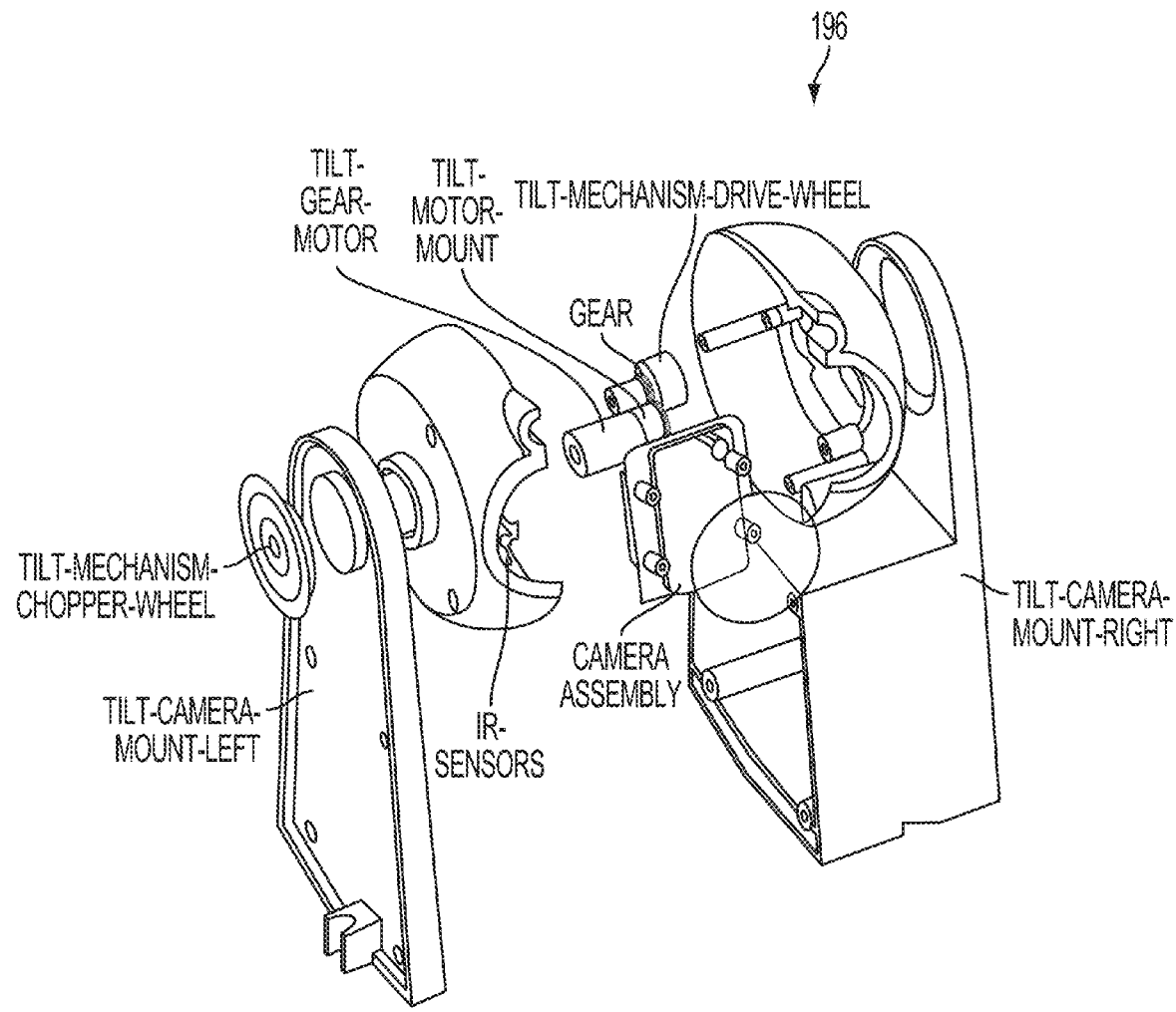
FIG. 23 is a partial cutaway exploded view of a robot camera having a motorized tilt and zoom mechanism operable by a remote user.
Figure 24:
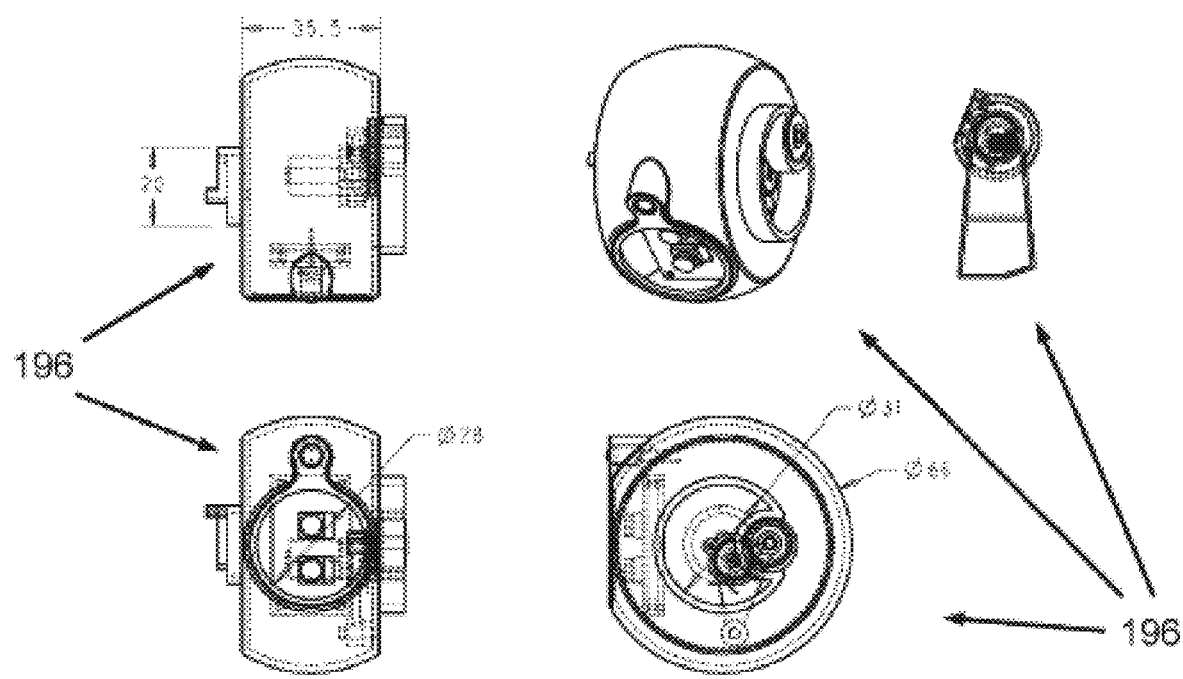
FIG. 24 is a series of isometric diagrams of the robot camera of FIG. 23.

As shown in FIGS. 23 and 24, the rotatable robot camera 196 may include a tilt mechanism, including a tilt gear motor and gears for adjusting the angular position of the robot camera 196.

Figure 27:
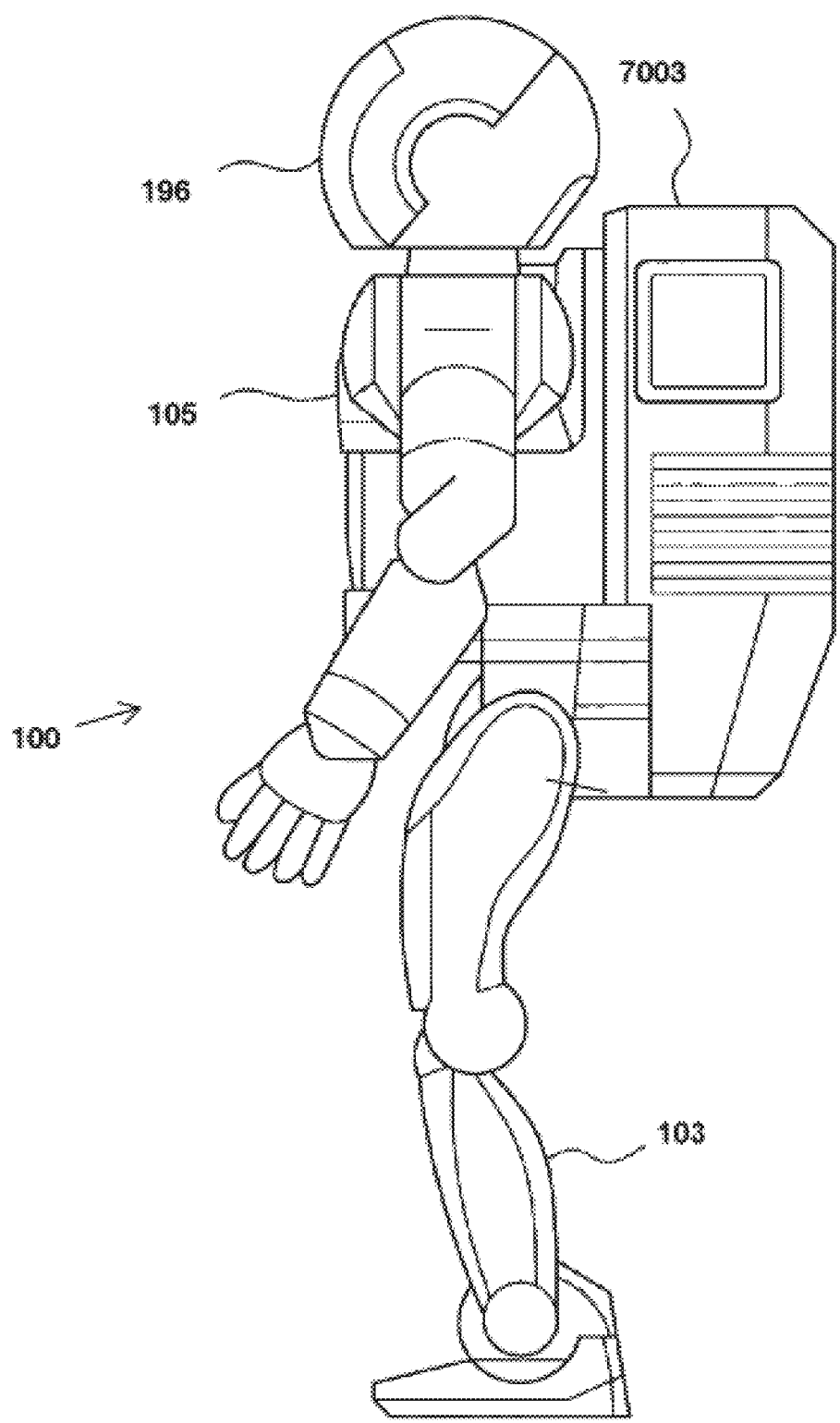
FIG. 27 is a profile view of a mobile robot having an example alternative drive system including bipedal legs.

FIG. 27 illustrates an example implementation of a mobile robot 100, in which the mobile robot 100 has a walking-type mobility platform 103. The walking type mobility platform 103 may include a bipedal leg-type drive system (see, for example, US Patent Application Publication 2006/0249314 to TAKENAKA, published Nov. 9, 2006, US Patent Application Publication 2005/0151496 to FURUTA, published Jul. 14, 2005, and US Patent Application Publication 2004/0027086 to OGAWA, published Feb. 12, 2004, each of which are incorporated herein by reference). Alternatively, the drive system may include a tread track-type mobility platform (such as used with the iRobot® PackBot®, as a non-limiting example), an insect-leg-type mobility platform, or any other mobility platform suitable for propelling the mobile robot 100. Also, the mobile robot 100 may include a component housing 7003 to contain the telecommunication processor, the wireless network transceiver, or other components.

Figure 19:
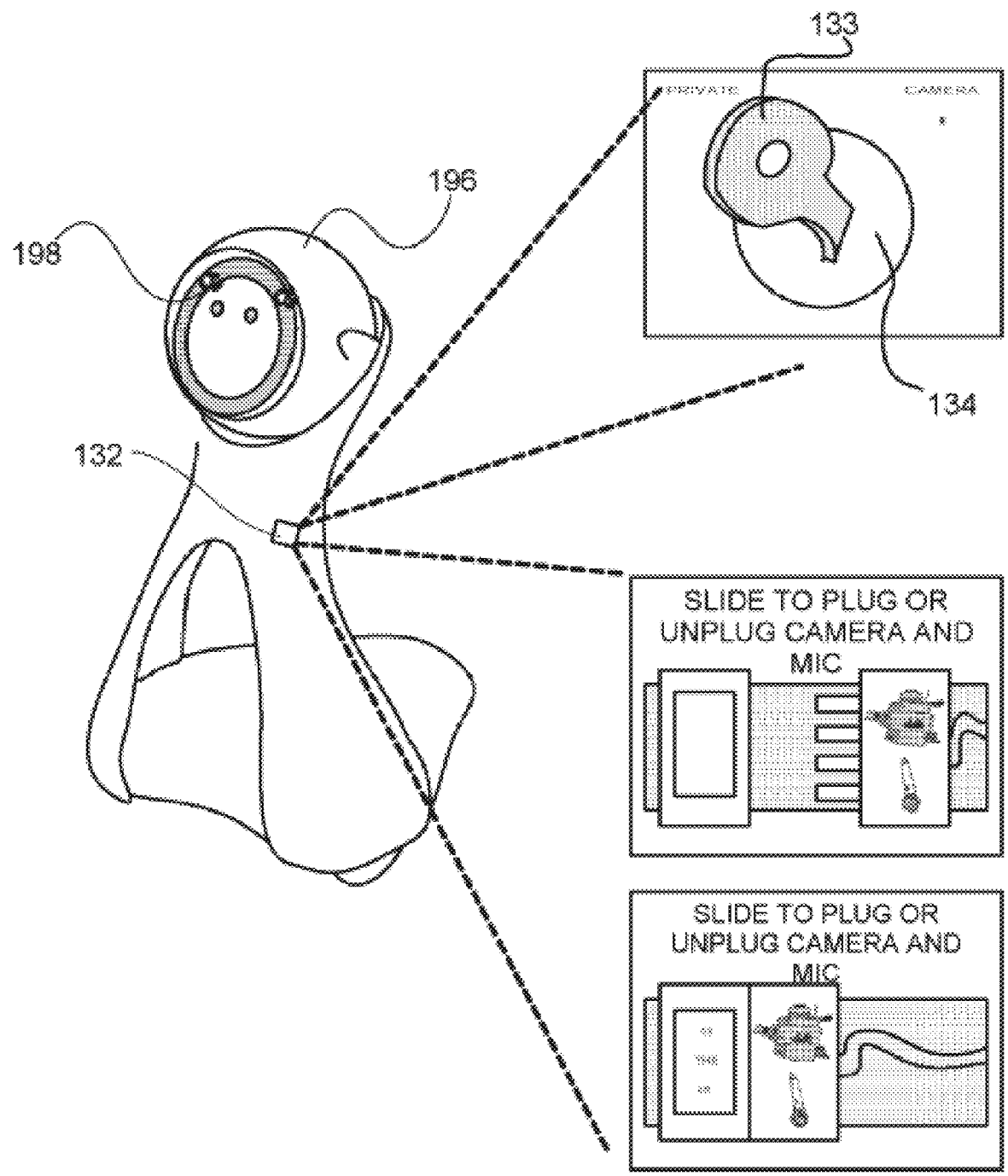
FIG. 19 is a partially exploded detail view of a mobile robot having a lock-and-key mechanism for toggling privacy mode, and a slidable privacy mechanism for preventing transmission of telecommunication data.

FIG. 19 illustrates a robot camera 196 that can be placed into the privacy mode using a key 133 inserted into a 134, in which turning the key 133 toggles the position of the robot camera 196 from enabled mode to the privacy mode. When the robot camera 196 is in the privacy mode position, the backstop 199 (see FIGS. 17 and 18) Obstructs the view of the robot camera 196. Further, the privacy position of the robot camera 196 provides visible assurance to users that the robot camera 196 cannot send out visual Observation of the mobile robot's surroundings.

Figure 25:
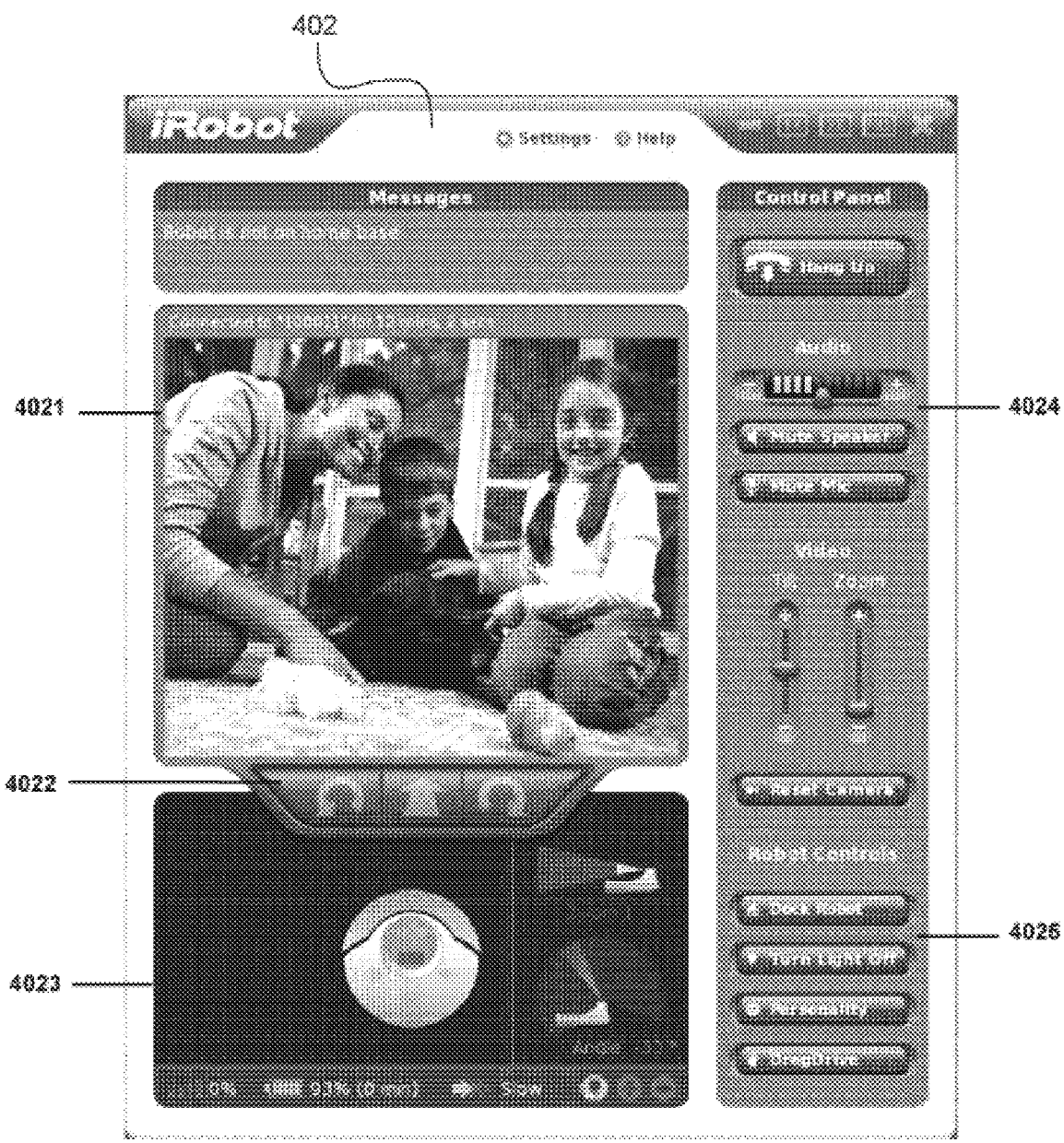
FIG. 25 is a screen shot of a remote user interface for using a mobile telecommunication robot.

FIG. 25 illustrates an example implementation of a remote user interface 402 provided to the remote user 400 at the remote terminal 430. In the remote user interface 402 is a camera window 4021 which shows the real-time video data sent from the robot camera 196 Clickable navigation icons 4022 permit the remote user 400 to navigate the mobile robot 100 by placing the screen cursor onto an icon representing a desired direction of turning (or straight ahead) and then clicking the mouse 438, for example. A robot control panel 4025 includes buttons for sending a robot control signal to control various robot functions, while the telecommunication windows 4024 includes indicators of current call status and also icons for controlling the initiation, termination, etc., of the telecommunication functionality of the mobile robot 100. A robot status window 4023 indicates the mode of operation (viewing angle, currently selected camera, etc.) of the robot camera 196.

In accordance with one example implementation, the mobile robot 100 may include a rotatable robot camera 196 that can rotate.

Software Component Organization

As one example of a telecommunication robot system, a mobile robot 100 and a remote terminal 430 (e.g., soft-phone) communicate over the Internet 901. To facilitate a reasonable user experience for the remote user 400, a back-end infrastructure is provided, such as the Internet-connected server 380, which performs matchmaking, facilitates NAT traversal and ties customer and account management to the existing customer relationship management services. In addition, the back-end infrastructure introduces product subscriptions, remote robot user interfaces, persistent robot history, and online software releases.

Figure 28:
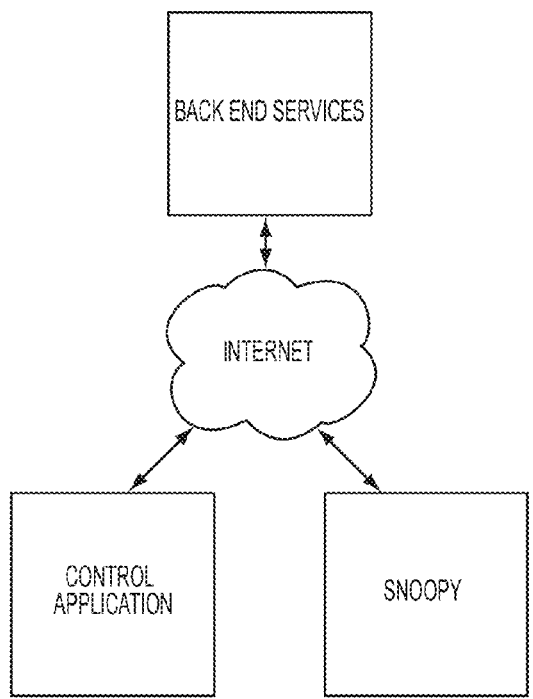
FIG. 28 is a schematic diagram illustrating a network component organization of a mobile telecommunication robot service.
Figure 29:
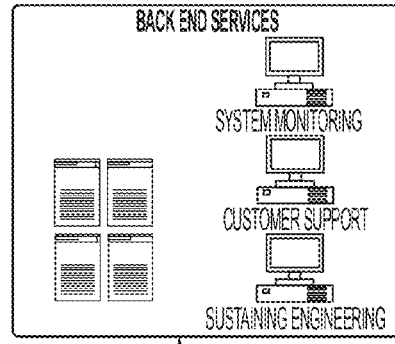
FIG. 29 is another schematic diagram illustrating a network component organization of a mobile telecommunication robot service.
Figure 29:
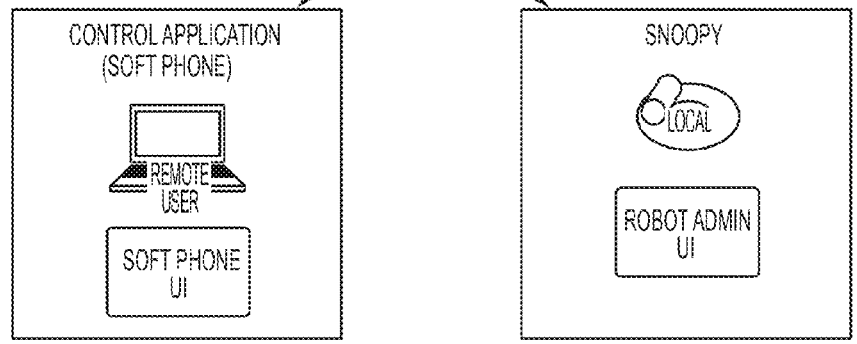
Figure 30:
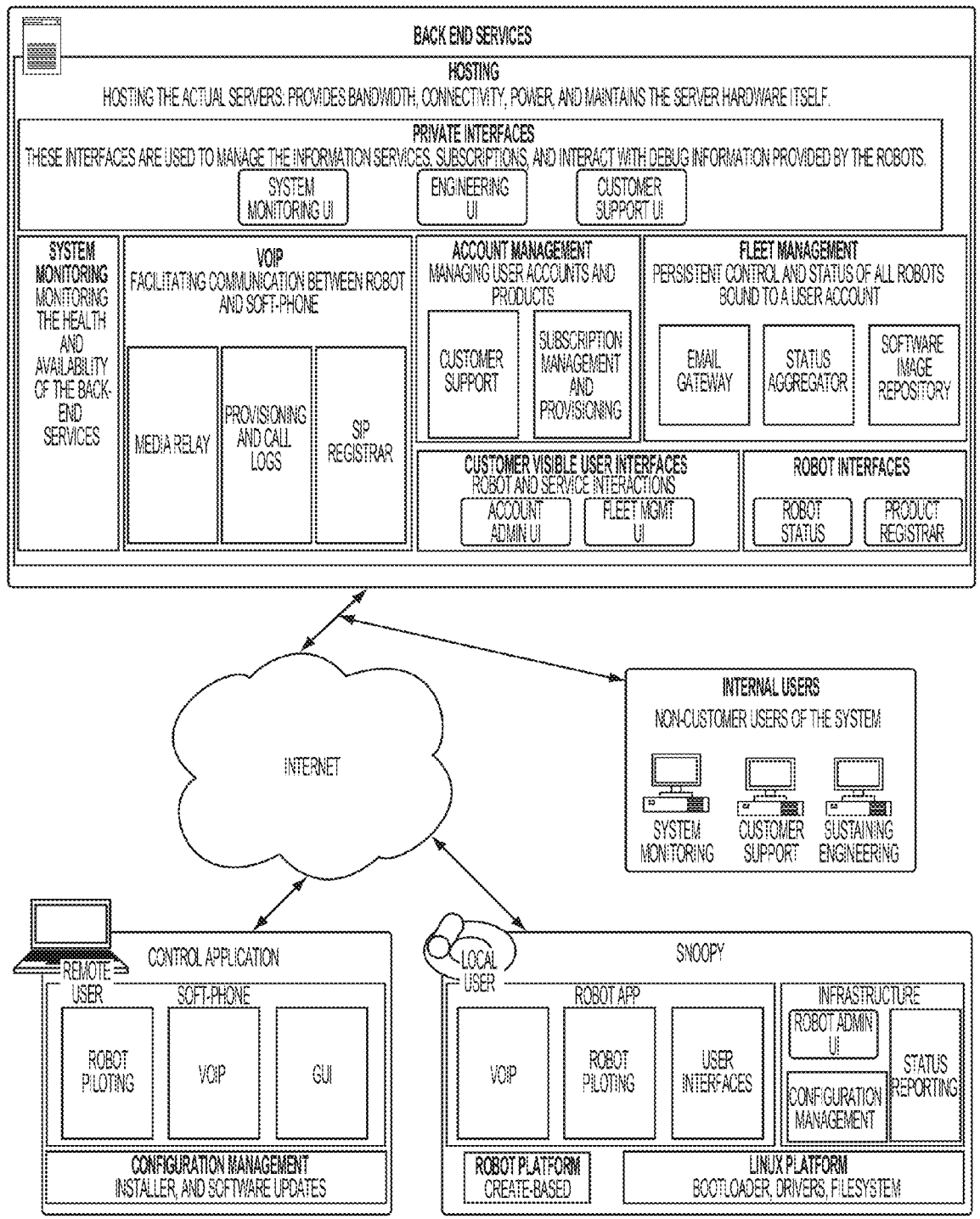
FIG. 30 is a schematic diagram illustrating a software component organization of a mobile telecommunication robot system.

In accordance with at least one example implementation, the back-end infrastructure: provides a SIP registry for ail robots and users, providing a location-free global address space for easier calling; facilitates firewall traversal such that users are not required to endure home networking configuration; allows owners to interact with online customer support by tying the SIP domain and product registration to iRobot's existing customer support infrastructure; acts as a gateway for extended product status, such as "robot stuck" messages and call history inappropriate or impossible to communicate directly by the robot; hosts software images (and release notes) for the product; and provides an environment to stage and deploy these and other new services enabled by a remote presence in the home The following discussion relates to the example component organizations illustrated in FIGS. 28 and 29.

In FIGS. 28 and 29, a conceptual view is provided of the system based on the three software platforms: "Snoopy;" "Control Application;" and "Back End Services." The "Control Application," or soft-phone is a software application that a customer (such as the remote user 400) installs on a PC (such as the remote terminal 430) to interact with his or her mobile robot 100 directly. This may include, for example, a binary application for Windows XP, bundled with the product. The "Snoopy" block refers to the software components of the mobile robot 100, executed on the telecommunication processor. This may include robot control software, a VoIP application, device drivers, and/or an embedded Linux software environment. The mobile robot 100 may also include an embedded web server and web interface used to configure the mobile robot 100 (e.g., via the tether interface 165).

The "Back End Services" run on one or more servers in a hosted environment, in accordance with one example implementation. These servers (e.g., the Internet server 380) introduce additional interfaces for maintaining the software services bundled with the product. The back-end infrastructure simplifies address lookups, facilitates firewall traversal, and adds remote robot monitoring capabilities. Internally, the infrastructure also provides customer and account management and service performance information The following are examples of back end services in accordance with at least one implementation:

Private Interfaces

Private interfaces are used internally or by our vendors to diagnose and manage mobile robots 100 in the field and the back-end infrastructure itself.

System Monitoring UI

It is assumed that all software components will provide mechanisms for service health monitoring. An associated user interface will be used by our hosting provider to maintain the infrastructure. The software may include monitoring functionality such as SNMP agents. The date may be aggregated into a single user interface or dashboard that can be used by the hosting vendor to maintain the servers. In addition, remote access to this information may be provided.

Engineering UI

Product development teams may interact with an Engineering UI service to determine appropriate over-subscription ratios and understand customer usage patterns.

Customer Support UI

This user interface may be used by customer support when diagnosing robot and/or networking issues. This user interface may include service level status, robot status, VoIP status, and subscription account information.

System Monitoring

This information is used by the hosting provider to gauge system health. This information is rendered into the "System Monitoring UI." For example, a network accessible syslog server, SNMP monitor, or similar software monitoring/logging system may be provided.

Media Relay

As discussed above with regard to the Internet server 380, the server 380 may function to perform relaying of UDP traffic (e.g., VoIP datagrams) between the remote terminal 430 and the mobile robot 100, allowing communication through firewalls. As one non-limiting example, a software product such as MediaProxy may be executed on the server 380 to provide this functionality, and may report its status via SOAP/XML or other suitable system.

Provisioning and Call Logs

In accordance with one non-limiting example implementation, a mobile robot 100 may be marketed with two bundled messaging accounts. In addition, additional users may be associated with an account such that multiple family members can each have their own soft-phone installation (for example, the functionality may be provided by executing a software product such as NGN-Pro for provisioning and/or CDRTool for call records, inter alia). This information may also be correlated to an existing customer database schema.

SIP Registrar

The directory service for robot and soft-phone phone numbers. As a benefit, the user may be shielded from technical complexities such as IP addresses and/or hostnames. As a non-limiting example, such functionality may be provided by executing a software product such as OpenSER to maintain an SIP domain.

Customer Support

Customer support may enable restricted access to subscription account information in order to troubleshoot messaging and account issues.

Subscription Management

Users may be enabled to self-manage (pay, cancel) their own messaging accounts.

Email Gateway

May be used to notify users of scheduled downtime. For example, when triggered by the status aggregator, this gateway may automatically notify the corresponding e-mail address with troubleshooting and/or intervention requests. This gateway may also be used to notify users of service-related issues.

Status Aggregator

This application may receive periodic status updates from the mobile robot 100, and uses this information to populate a database for use by customer support and the fleet manager UI. Can provide interoperability with existing infrastructure such that robot status (e.g., battery voltage) can be seen via, for example, a web-based fleet management interface.

Software Image Repository

Software updates will be hosted by our infrastructure. This will be used by customers to update robot, media board, and soft phone software. Robot Interfaces may be provided as HTTP-based interfaces for robot to back-end communication:

Robot Status

The mobile robot 100 may use this secure link to receive status updates for robots in the field. The application decodes and publishes status to persistent storage (e.g., a relational database) for use by the various user interfaces.

Product Registrar

The product registrar receives configuration information from the mobile robot 100 when a robot owner configures his or her mobile robot 100 and messaging account. This CGI application decodes and pushes this data to the other services to register a subscription, and provision a SIP address, for example. The CGI application may update a global customer record with product and subscription information, for example.

Robot Administrator UI

This is a web-based user interface used tier initial configuration and occasional administration. This interface may be limited to the local user, but does display basic status. For example, the interface may be provided by an embedded webserver (running a suitable http server such as, e.g., thttpd) on the telecommunication processor of the mobile robot 100.

Example Use Scenarios

The following are brief example use scenarios:

A. Out of Box Experience

Initial experience for a new customer:

1. User configures mobile robot 100 using Account Admin UI served by the mobile robot 100, using his/her global iRobot account credentials.

2. User submits form on the mobile robot 100, which then relays portions of the data to the Product Registrar.

3. Product Registrar validates customer account, registers the mobile robot 100 and binds a subscription to it.

4. Product Registrar provisions accounts for the mobile robot 100 and soft phone (e.g., the remote terminal 430) with SIP Registrar.

5. Product Registrar returns success to Robot Admin on the mobile robot 100.

6. Robot Admin indicates success to user, and has Configuration Management notify the Robot Application of the configuration changes.

7. User installs soft-phone and dials first call to the robot.

8. The soft-phone VOW stack contacts the SIP registrar, which validates the soft-phone and returns the address information of the robot.

9. The soft-phone VoIP stack contacts the robot application and establishes a call.

10. Audio and video begins streaming between robot and soft-phone. These streams pass through the Media Relay.

11. Provisioning and Call Logs logs the call (but not the data).

B. Account Provisioning

User wants to register another account for her husband:

1. User logs into Account Admin UI and adds another SIP number and password to the robot subscription.

2. Information is forwarded to SIP Registrar.

3. Later, husband downloads soft-phone installer from Software Image Repository and installs on his desktop.

4. Husband uses the new SIP credentials to login to Snoopy. He has to enter PIN number as given to him by user (this information is not stored by iRobot).

C. Robot Stuck

The mobile robot 100 gets stuck and cannot find its way back to the base station/dock 200:

1. Robot Platform decides it has tried too tong to find the dock. It notifies Robot App, which spawns a message using the robot's Status Reporting module.

2. Status Reporting sends HTTP POST to Robot Status module on back-end.

3. Robot Status updates database.

4. The database update triggers an Email Gateway to notify the main user.

5. Email Gateway looks up the paired email account from the Customer Support module and sends a message to that user: "Robot could not find dock, please login and drive to dock."

D. Robot Diagnostics and Customer Support

Mobile robot 100 has failed it could not reach the dock or base station 200 and has since lost power, and the user missed the email notifications from the mobile robot 100:

1. Remote user 400 tries calling the mobile robot 100, but fails.

2. The remote user 400 contacts customer support (via web, soft-phone, or telephone, as non-limiting examples).

3. Customer support contact opens Customer Support UI and enters global account login for remote user 400.

4. Customer support queries Subscription Management and Provisioning for subscription status. Subscription is valid.

5. Customer support queries Provisioning and Call Logs to examine call records. No unusual loss of networking or error codes detected.

6. Customer support queries Status Aggregator and finds stuck, and power down messages from the mobile robot 100.

7. Customer support instructs the remote user 400 about the failure and logs the call.

8. Customer calls home and has mobile robot 100 put on dock.

Although various exemplary implementations have been discussed hereinabove, the claimed subject is not limited necessarily thereto. Rather, the claimed subject matter relates to the features of the accompanying claims and their equivalents.

What is claimed is:

1. A method comprising:
receiving, in non-transitory storage, configuration information from a mobile telepresence robot;
updating, using a computer processor in communication with the non-transitory storage, a user account stored in the non-transitory storage using the configuration information;
provisioning, using the computer processor, a session initiation protocol address using the configuration information;
receiving, at the computer processor, a Voice-over-Internet Protocol datagram from a remote computing device, the Voice-over-Internet Protocol datagram including a request for establishing a communication connection between the remote computing device and the mobile telepresence robot; and instantiating, at the computer processor, a communication connection between the remote computing device and the telepresence robot.

2. The method of claim 1, further comprising decoding the configuration information using the computer processor.

3. The method of claim 1, further comprising sending a confirmation message from the computer processor to the robot after successfully provisioning the session initiation protocol address.

4. The method of claim 1, further comprising validating the remote computing device before instantiating the communication connection.

5. The method of claim 1, further comprising receiving periodic status updates at the computer processor from the robot and storing the status updates in the non-transitory storage.

6. The method of claim 1, further comprising sending a customer support message from the computer processor to the remote computing device in response to a received status update.

7. The method of claim 1, further comprising diagnosing a robot operating or networking issue based on a received status update.

8. The method of claim 1, further comprising displaying a fleet management interface providing service, health, or operating data related to the robot.

9. The method of claim 1, further comprising sending, from the computer processor, a data packet to an apparent Internet Protocol address associated with the telepresence robot.

10. A hosting device comprising:

a hosting computing device located at a first location, different from a second location of a mobile telepresence robot and a third location of a telepresence computing device in wireless communication with the mobile telepresence robot through a firewall interposed between the mobile telepresence robot and the telepresence computing device, the hosting computing device in wireless communication with the mobile telepresence robot and the telepresence computing device, the host computing device relaying User Datagram Protocol traffic between the mobile telepresence robot and the telepresence computing device through the firewall.

11. The hosting device of claim 10, wherein the host computing device:

receives periodic status updates from the mobile telepresence robot; and stores the status updates in non-transitory storage in communication with the hosting computing device.

12. The hosting device of claim 11, wherein the host computing device decodes the status updates before storing the status updates in a non-transitory storage.

13. The hosting device of claim 11, wherein the host computing device sends a customer support message to the telepresence computing device in response to a received status update.

14. The hosting device of claim 11, wherein the host computing device diagnoses a robot operating or networking issue based on a received status update.

15. The hosting device of claim 11, wherein the host computing device displays a fleet management interface providing service, health, or operating data related to the robot.

16. The hosting device of claim 10, wherein the host computing device receives configuration information from the robot in response to user configuration of the robot or a messaging account associated with the robot.

17. The hosting device of claim 16, wherein the host computing device provisions a session initiation protocol address using the configuration information.

18. The hosting device of claim 16, wherein the host computing device decodes the configuration information and pushes the decoded configuration information to one or more services in communication with the host computing device.

19. The hosting device of claim 16, wherein the host computing device decodes the configuration information and updates a customer record stored in non-transitory storage.

* * * * *

UNITED STATES PATENT AND TRADEMARK OFFICE
CERTIFICATE OF CORRECTION

PATENT NO.        : 9,296,109 B2                                        Page 1 of 1
APPLICATION NO.   : 14/512842
DATED             : March 29, 2016
INVENTOR(S)       : Mathew Cross et al.

It is certified that error appears in the above-identified patent and that said Letters Patent is hereby corrected as shown below:

ON THE TITLE PAGE

The Abstract, at line number 2, should read "A system including a mobile telepresence robot, a telepresence computing device in wireless communication with the robot, and a host computing device in wireless communication with the robot and the telepresence computing device. The host computing device relays User Datagram Protocol traffic between the robot and the telepresence computing device through a firewall."

Signed and Sealed this
Thirty-first Day of May, 2016

Michelle K. Lee
*Director of the United States Patent and Trademark Office*